United States Patent
Pedersen

(10) Patent No.: US 12,197,721 B2
(45) Date of Patent: Jan. 14, 2025

(54) PREDICTIVE INPUT INTERFACE HAVING IMPROVED ROBUSTNESS FOR PROCESSING LOW PRECISION INPUTS

(71) Applicant: Google LLC, Mountain View, CA (US)

(72) Inventor: Zebedee Pedersen, East Sussex (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/013,095

(22) PCT Filed: Jun. 17, 2022

(86) PCT No.: PCT/US2022/034029
§ 371 (c)(1),
(2) Date: Dec. 27, 2022

(87) PCT Pub. No.: WO2023/224644
PCT Pub. Date: Nov. 23, 2023

(65) Prior Publication Data
US 2024/0231607 A1    Jul. 11, 2024

Related U.S. Application Data

(60) Provisional application No. 63/344,214, filed on May 20, 2022.

(51) Int. Cl.
*G06F 3/04886* (2022.01)
*G06F 3/01* (2006.01)
*G06F 3/04842* (2022.01)

(52) U.S. Cl.
CPC .......... *G06F 3/04886* (2013.01); *G06F 3/017* (2013.01); *G06F 3/04842* (2013.01); *G06F 2203/04803* (2013.01)

(58) Field of Classification Search
CPC .. G06F 3/04886; G06F 3/04842; G06F 3/017; G06F 2203/04803
See application file for complete search history.

(56) References Cited

U.S. PATENT DOCUMENTS 5,953,541 A     9/1999   King et al.
8,335,993 B1 *  12/2012  Tan ..................... G06F 3/04886
                                                 715/837

(Continued)

OTHER PUBLICATIONS

International Search Report and Written Opinion for PCT/US2022/034029, mailed on Mar. 27, 2023, 22 pages.

(Continued)

*Primary Examiner* — Tadesse Hailu
(74) *Attorney, Agent, or Firm* — DORITY & MANNING P.A.

(57) ABSTRACT

The present disclosure is directed to prediction and assistive techniques using a multi-region graphical keyboard interface. In particular, the system can present, on a display of a computing device, a graphical keyboard having a plurality of key regions. The plurality of key regions can include a first key region having a first set of keys and a second key region having a second set of keys. Additionally, the system can receive a first input selecting a first selected region from the plurality of key regions. Moreover, the system can determine, based at least in part on the first input, a first suggestion and a second suggestion. Furthermore, in response to the first input, the system can present, on the display of the computing device, an updated graphical keyboard having the plurality of key regions and a suggestion region. The suggestion region includes the first suggestion and the second suggestion.

20 Claims, 14 Drawing Sheets

(56) References Cited

U.S. PATENT DOCUMENTS

| | | | | |
|---|---|---|---|---|
| 8,547,354 B2* | 10/2013 | Koch | ................... | G06F 3/04886 |
| | | | | 345/169 |
| 2001/0028808 A1* | 10/2001 | Nomura | ............. | H04N 1/00352 |
| | | | | 399/81 |
| 2007/0152978 A1 | 7/2007 | Kocienda et al. | | |
| 2010/0125811 A1* | 5/2010 | Moore | ................ | G06F 3/04817 |
| | | | | 715/846 |
| 2015/0040055 A1* | 2/2015 | Zhao | ................... | G06F 3/04886 |
| | | | | 715/773 |
| 2015/0253870 A1* | 9/2015 | Ikeda | ................. | G06F 3/04883 |
| | | | | 345/158 |
| 2015/0378982 A1* | 12/2015 | Mckenzie | ............. | G06F 3/0236 |
| | | | | 715/261 |
| 2017/0068448 A1 | 3/2017 | Ghassabian | | |
| 2017/0308289 A1* | 10/2017 | Kim | ...................... | G06F 3/0237 |

OTHER PUBLICATIONS

Invitation to Pay Additional Fees for PCT/US2022/034029, mailed on Feb. 6, 2022, 17 pages.

* cited by examiner

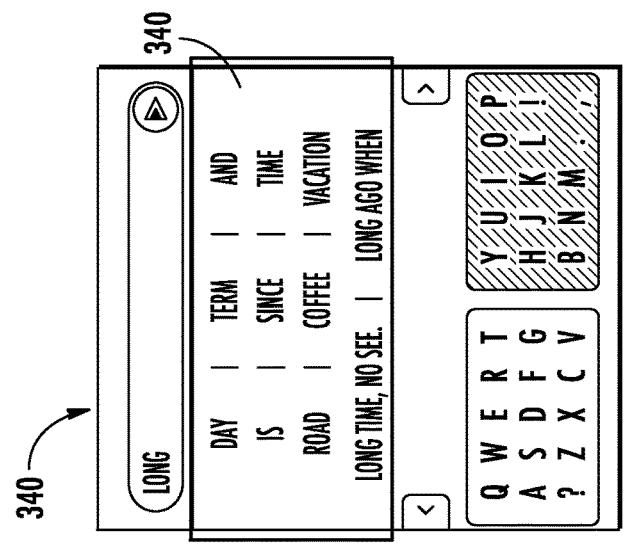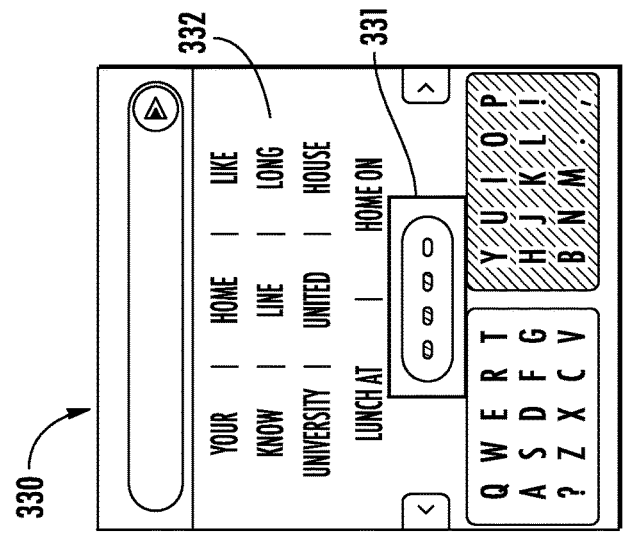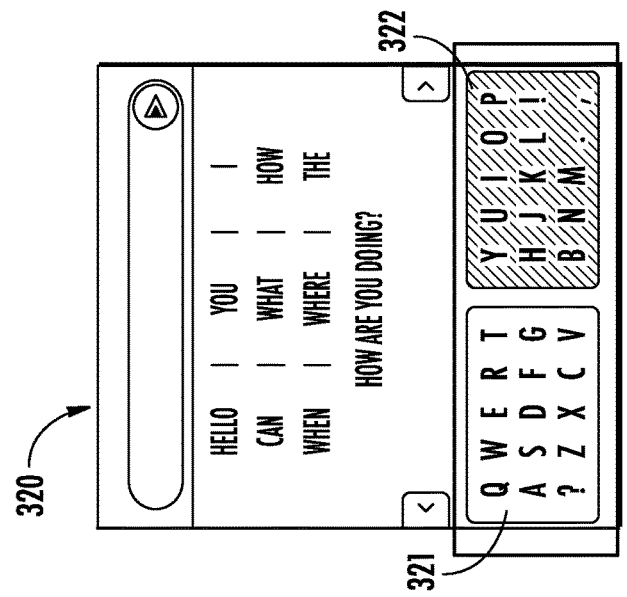
FIG. 3E
FIG. 3D
FIG. 3C ific aspects of predictive input interfaces.

PREDICTIVE INPUT INTERFACE HAVING IMPROVED ROBUSTNESS FOR PROCESSING LOW PRECISION INPUTS

CROSS-REFRENCE TO RELATED APPLICATIONS

This application is based upon and claims the right of priority under 35 U.S.C. § 371 to International Application No. PCT/US2022/034029 filed on Jun. 17, 2022, which claims the benefit of priority of U.S. Application No. 63/344,214 having a filing date of May 20, 2022. Applicant claims priority to and the benefit of each of such applications and incorporates each of such applications herein by reference in its entirety.

FIELD

The present disclosure relates generally to systems and methods for receiving user input with limited precision user interaction. More particularly, the present disclosure relates to prediction and assistive techniques using a multi-region graphical keyboard interface.

BACKGROUND

Computing devices can perform many tasks and provide various functionality. Accessing such functionality often involves interaction with the computing device(s) through an input interface. Different types of interfaces enable users to interact with and control such devices. Some interfaces can include numerous input options arranged such that low precision inputs can lead to errors or even complete inoperability of the computing device.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes presenting, on a display of a computing device, a graphical keyboard having a plurality of key regions. The plurality of key regions include a first key region having a first set of keys and a second key region having a second set of keys. Additionally, the method includes receiving, by the computing device, a first input selecting a first selected region from the plurality of key regions. Moreover, the method includes determining, by the computing device based at least in part on the first input, a first suggestion and a second suggestion. Furthermore, the method includes presenting, on the display of the computing device and in response to the first input, an updated graphical keyboard having the plurality of key regions and a suggestion region. The suggestion region can include the first suggestion and the second suggestion.

In some implementations each key of the first set of keys and each key of the second set of keys corresponds to a symbol. In some implementations the corresponding symbols are glyphs. A glyph can be a single representation of a character. In some implementations the glyphs are letters of an alphabet, numbers, marks to pronounce a letter, and/or punctuations. In some implementations the glyphs are graphemes. A grapheme can be a letter or a number of letters that represent a sound in a word.

In some implementations, each key of the graphical keyboard is assigned to one of the first key region and the second key region.

In some implementations, the method can further include receiving, by the computing device, a second input selecting a second selected region from the plurality of key regions. Additionally, the method can include determining, by the computing device based at least in part on the first input and the second input, an updated suggestion. Furthermore, the method can include presenting the updated suggestion in the suggestion region of the updated graphical keyboard.

In some implementations, the updated suggestion can be determined based on a ranking of a plurality of words, and wherein the updated suggestion is a suggested word with an exact match of the first input and the second input. Additionally, the plurality of words can be further ranked based on previous user interactions with the plurality of words.

In some implementations, the updated suggestion can be a suggested word with a partial match of the first input and the second input, and wherein the suggested word begins with characters (e.g., letters, numbers, punctuations) associated with the first input and the second input.

In some implementations, the updated suggestion can be a suggested phrase with a partial match of the first input and the second input, and wherein the suggested phrase begins with characters associated with the first input and the second input.

In some implementations, the updated graphical keyboard can include a sequence region. The method can further include determining, based on the first selected region, a first determined symbol from a plurality of symbols. The plurality of symbols can include a first symbol corresponding to the first key region and a second symbol corresponding to the second key region. Additionally, the method can include presenting the determined symbol in the sequence region of the updated graphical keyboard. Moreover, the first selected region can be the first key region, and the method can further include receiving, by the computing device, a second input selecting the second key region. Furthermore, the method can include determining, by the computing device based on the second input, a second determined symbol from the plurality of symbols. The second determined symbol can be different from the first determined symbol. Subsequently, the method can include presenting the second determined symbol in the sequence region of the updated graphical keyboard. In some instances, the first determined symbol is a first shape of a first color, and the second determined symbol is the first shape of a second color.

In some implementations, the plurality of key regions can include a third key region having a third set of keys. The third set of keys can be different from the first set of keys and the second set of keys.

In some implementations each key of the graphical keyboard is assigned to one of the first key region, the second key region, and the third key region.

In some implementations, the plurality of key regions can include a fourth key region having a fourth set of keys. For example, the first set of keys can be keys located in a top-left quadrant of the graphical keyboard, the second set of keys can be keys located in a top-right quadrant of the graphical keyboard, the third set of keys can be keys located in a bottom-left quadrant of the graphical keyboard, and the fourth set of keys can be keys located in a bottom-right quadrant of the graphical keyboard.

In some implementations, each key of the graphical keyboard is assigned to one of the first key region, the second key region, the third key region, and the fourth key region.

In some implementations, the first set of keys can be keys located in a left column of the graphical keyboard, and the second set of keys can be keys located in the right column of the graphical keyboard.

In some implementations, the computer device can include a first physical button and a physical second button. Additionally, the first input is received by a user pressing the first physical button or the second physical button.

In some implementations, the method can further include receiving, by a sensor coupled to the computing device, a gesture. Additionally, in response to the gesture, the method can include selecting the first suggestion.

In some implementations, the first key region can have a greater number of keys than the second key region.

In some implementations, the first suggestion is a word, and the second suggestion is a phrase.

Another example aspect of the present disclosure is directed to a system. The system includes one or more processors and a memory storing instructions that when executed by the processor(s) cause the system to perform operations. The operations include presenting, on a display of the computing device, a graphical keyboard having a plurality of key regions. The plurality of key regions can include a first key region having a first set of keys and a second key region having a second set of keys. Additionally, the operations include receiving a first input selecting a first selected region from the plurality of key regions. Moreover, the operations include determining, based at least in part on the first input, a first suggestion and a second suggestion. Furthermore, in response to the first input, the operations include presenting, on the display of the computing device, an updated graphical keyboard having the plurality of key regions and a suggestion region. The suggestion region can include the first suggestion and the second suggestion.

In some implementations, the updated graphical keyboard can include a sequence region. The operations can further include receiving a second input selecting a second selected region from the plurality of key regions. Additionally, the operations can include determining, based at least in part on the first input and the second input, an updated suggestion. Moreover, the operations can include determining, based on the first input, a first determined symbol associated with the first input from a plurality of symbols. The plurality of symbols can include a first symbol corresponding to the first key region and a second symbol corresponding to the second key region. Furthermore, the operations can include determining, based on the second input, a second determined symbol associated with the second input from the plurality of symbols. Subsequently, the operations can include presenting the first determined symbol and the second determined symbol in the sequence region of the updated graphical keyboard and presenting the updated suggestion in the suggestion region of the updated graphical keyboard.

A further example of the present disclosure is directed to one or more non-transitory computer-readable media. The non-transitory computer-readable media can comprise instructions that when executed by one or more computing devices cause the computing device(s) to perform operations. The operations include presenting, on a display of a computing device, a graphical keyboard having a plurality of key regions, wherein the plurality of key regions include a first key region having a first set of keys and a second key region having a second set of keys. Additionally, the operations include receiving a first input selecting a first selected region from the plurality of key regions. Moreover, the operations include determining, based at least in part on the first input, a first suggestion and a second suggestion. In response to the first input, the operations include presenting, on the display of the computing device, an updated graphical keyboard having the plurality of key regions and a suggestion region, wherein the suggestion region includes the first suggestion and the second suggestion.

A further example of the present disclosure is directed at a computing system. The system includes one or more processors; and one or more memory devices storing instructions that are executable to cause the one or more processors to perform operations. The operations include rendering, on a display component, a graphical array of input features. The graphical array of input features include a first plurality of input features associated with a first region and a second plurality of input features associated with a second region. Additionally, the operations include determining, based on one or more inputs received from an input component, a region sequence encoding descriptive of a sequence comprising one or more selections of the first region or the second region. Furthermore, the operations include generating, based on the region sequence encoding, one or more suggested inputs.

In some implementations, the input features can correspond to language symbols, and wherein the one or more suggested inputs comprise suggested words of a language.

In some implementations, the first region can correspond to a first area of a graphical keyboard and wherein the second region corresponds to a second area of the graphical keyboard.

In some implementations, the one or more inputs can comprise inputs associated with input signals respectively assigned to the first region and the second region.

In some implementations, the input signals can correspond to one or more physical toggles.

In some implementations, the input signals can respectively correspond to areas of a touch screen respectively overlying the first region and the second region.

In some implementations, the input signals respectively correspond to a peripheral component.

In some implementations, wherein the generating, based on the region sequence encoding, one or more suggested inputs includes: inputting, to a machine-learned model, the region sequence encoding; and generating, using the machine-learned model, the one or more suggested inputs.

In some implementations, wherein the generating, using the machine-learned model, the one or more suggested inputs includes generating a probability distribution corresponding to the one or more suggested inputs.

In some implementations, the machine-learned model includes a natural language model.

In some implementations, the machine-learned model includes one or more transformer architectures.

In some implementations, the machine-learned model can be trained on an unsupervised dataset based on, for a target keyboard layout, a sequence of regions associated with input of the symbols corresponding to a word in a vocabulary.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 3A-J depict example graphical user interfaces (GUIs) according to example embodiments of the present disclosure;

DETAILED DESCRIPTION

Figure 1A:
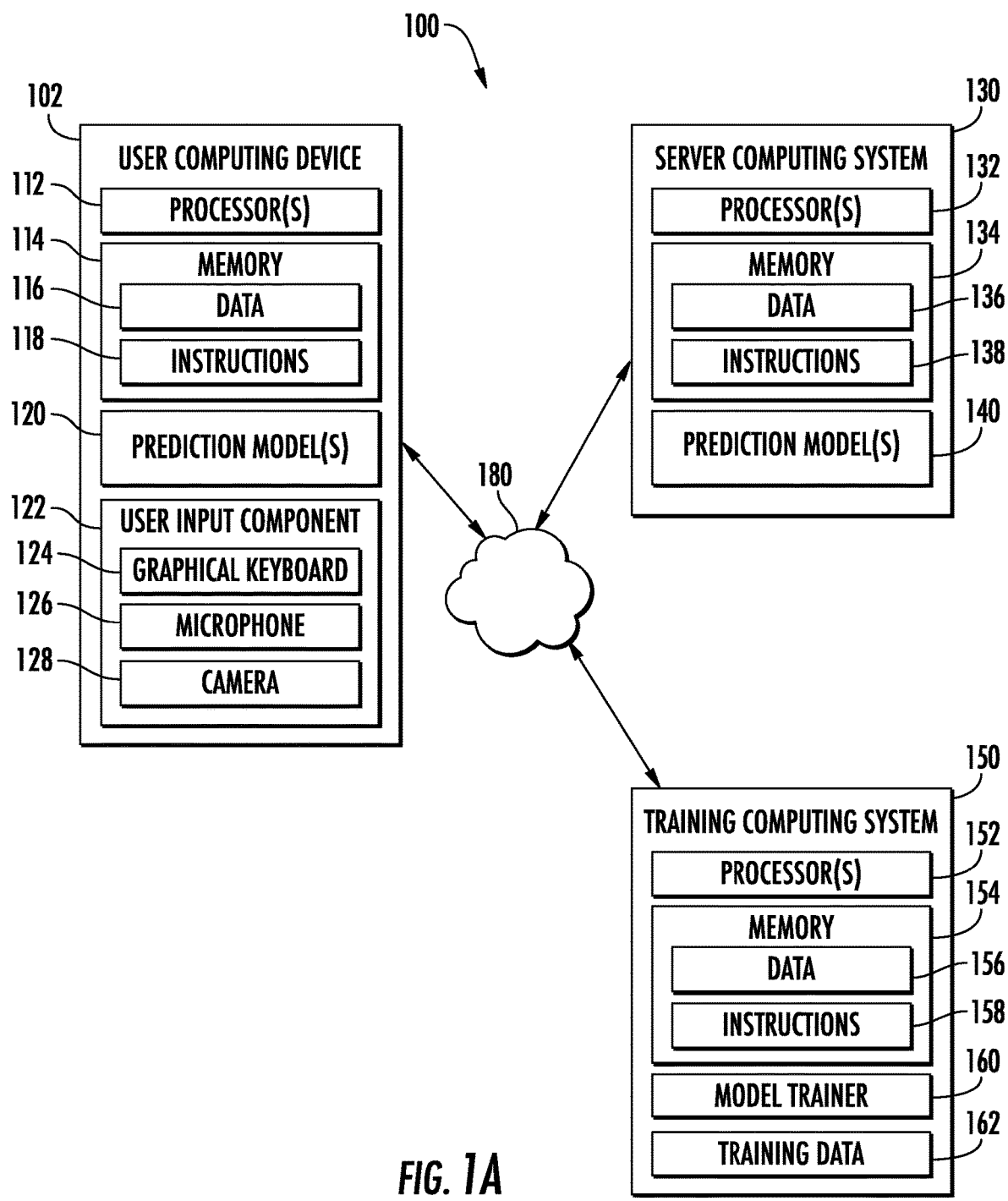
FIGS. 1A-1C depict an example computing environment according to example embodiments of the present disclosure.

Example embodiments according to aspects of the present disclosure relate to computing device interfaces providing for improved robustness for processing low-precision inputs. For instance, an example interface according to aspects of the present disclosure can include associating a first group of granular input features (e.g., buttons) with a first input region of the interface and a second group of granular input features with a second input region of the interface. In addition, or in alternative to processing selection(s) of the granular input features, example systems and methods according to the present disclosure can process the selection of the respective region(s) with which the selected granular input features are associated. In some examples, the sequence of selected region(s) can be used to predict the desired granular input. Advantageously, in some examples, inputs selecting a region can be processed with higher confidence than inputs selecting a granular input feature, due to a lower precision threshold associated with selection of the correct region compared to selection of the correct granular input feature. In this manner, for example, the interface can leverage the higher-confidence region-level inputs to improve the interface tolerance for processing low-precision selection of granular input features.

In a text entry example, a keyboard configured according to example aspects of the present disclosure can have a first group of letter keys associated with a left region of the keyboard and a second group of letter keys associated with a right region of the keyboard. Due to the size of the keys in relation to the size of the left and right regions, the spatial precision associated with selection of a particular key associated with a desired symbol may be much higher than the spatial precision associated with selection of the correct region associated with the desired symbol. In this manner, for instance, a sequence of Left-Right-Left-Left can be received with higher confidence than a particular sequence of received keystrokes. The higher-confidence sequence can then be used to predict the desired sequence of symbols, thereby improving the keyboard's robustness toward low-precision key inputs.

Input interfaces according to example aspects of the present disclosure can provide for a number of benefits over conventional input processing techniques, such as by improving accessibility of computing device functionality for differently abled users. For instance, in contrast to the presently described techniques, conventional interfaces for inputting text to computer systems can typically be accomplished using digitized variants of traditional (i.e., physical) keyboard layouts, with a single key for each character (e.g., the QWERTY layout for English language, or the QWERTZ layout for German language). These conventional interfaces assume sufficient dexterity on the part of the operating user to interact with individual character keys in order to input text. But differently abled users (e.g., with abilities permanently or temporarily determined by physical capacity, environmental constraints, clothing constraints, etc.) may not possess the requisite level of dexterity in order to input text on conventional systems, such that the conventional interfaces render such conventional systems difficult if not impossible to use. Furthermore, existing low-precision input formats (e.g., Morse code) typically require users to learn an entirely new paradigm of input communication.

Additionally, example interfaces described herein can facilitate interaction with and control of computing devices that have constraints for any or all users. Such constraints may be inherent. For instance, some computing devices have small input interfaces, such that granular input can be impracticable (e.g., a smartwatch with a touchscreen being small in relation to a finger or stylus, with limited physical space for buttons, etc.). Some computing devices can have constraints determined by convention or convenience. For instance, televisions traditionally are not associated with full keyboards for text entry, instead traditionally being equipped only with a remote control having limited alphanumeric input options. The alphanumeric input options can be difficult to use because of a small input interface, having about dozen small keys in the remote control, a non-QWERTY layout, and having to press a button multiple times in order to select a letter. Similarly, gaming consoles are often used primarily with gaming input controllers, such that switching to a different input device (e.g., a full keyboard) may be inefficient and inconvenient.

In some embodiments, a user interface can include a typing system having a multi-region keyboard interface (e.g., virtual keyboards, on-screen keyboards, physical keyboards) that can be used to operate a computing device. (Various examples described herein are presented in the context of symbolic or other text entry. It is to be understood, however, that the scope of the present disclosure is not limited to text entry devices.) The typing system can operate desktop computers, laptop computers, tablet computers, smartphones, wearable computing devices, virtual reality systems, smart televisions, gaming consoles, or substantially any computing device. Additionally, or alternatively, the typing system can enable users to operate computer devices with the aid of a peripheral, such as an assistive technology interface (e.g., a head mouse, switch control, gesture detection device, gaze detection device, electromyography sensors).

In some implementations, the graphical keyboard interface can be utilized with computing devices, such as a smartphone, and enable their operation by users whose situationally, contextually, or permanently limited dexterity would otherwise prevent them from inputting text using a standard keyboard. For instance, typing on a small, touchscreen-based mobile phone keyboard may be more challenging while standing on a bouncing train car than while seated in a café. Additionally, the technique described herein can unlock significant improvements in the text entry experience on computing devices which may inherently or traditionally be unsuitable to the task due to their size or interface constraints. For example, smart watches have screens that are too small for traditional keyboards requiring direct presses, and for which only cumbersome text entry alternatives exist. In another example, virtual reality headsets can have a virtual keypad for which their handheld pointer or controllers are unsuited due to lack of precision. In yet another example, televisions and game consoles can have remote controllers that typically employ directional navigation controls which require many iterative clicks to traverse a keyboard to enter text. In yet another example, in-car navigation systems may require large screens to be used in interior design to facilitate information entry.

In some implementations, word and/or phrase prediction techniques can assist with text entry in a computing system. Word and/or phrase prediction techniques can enable the reduction of the number of required keystrokes, by predicting a word or a phrase that a user is intending to input. Additionally, the prediction techniques can suggest a word subsequent to the word currently being inputted. Furthermore, prediction techniques can include other features, such as spell check, speech synthesis, and shortcuts for frequently used words.

Example aspects of the present disclosure are directed to a data entry system for computing devices using predictive text modeling techniques to enable a minimal interface that is optimized for robustness for processing low-precision inputs (e.g., for operation by users in limited dexterity contexts). A typing system (e.g., the system for data entry) can include a multi-region (e.g., two-button, three-button, four-button) keyboard with characters (e.g., letters, punctuation) grouped into different regions. The symbols can be grouped into a plurality of regions, where each region can be presented as a graphical button or collection of buttons in the multi-region graphical keyboard interface. For example, the graphical buttons can be larger than an individual key button to enable large surfaces for ease of user interaction. The typing system can also include a suggestion region (e.g., prediction area) in which directly matched and/or predicted text entries are displayed. The suggestion region can be graphically larger than an individual key button for ease of user interaction. Additionally, the typing system can include a sequence region that presents to a user the sequence of previously entered user input (e.g., a sequence of graphical button(s) selected).

The technology described herein can provide a number of technical effects and benefits. For example, as previously indicated, the technology described herein can present a multi-region keyboard interface to be easier to operate, especially for users with dexterity constraints. Additionally, the prediction techniques described herein predict and suggest relevant words and/or phrases which can allow a user to input data quicker, thereby reducing time spent typing, editing, and other graphical user interface interactions, thus conserving computing resources (e.g., energy, processing cycles, network bandwidth, and/or the like). One or more aspects of the graphical keyboard interface can be configured to provide access to a easy-to-use keyboard interface for user with limited dexterity With reference now to the figures, example embodiments of the present disclosure will be discussed in further detail.

Example Devices and Systems

FIG. 1A depicts a block diagram of an example computing system 100 that performs assistive and predictive input techniques according to example embodiments of the present disclosure. The system 100 can include a user computing device 102, a server computing system 130, and a training computing system 150 that can be communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, a smart device (e.g., smart television, smart appliance), a virtual reality system, an augmented reality system, or any other type of computing device.

The user computing device 102 can include one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more prediction models 120. For example, the prediction models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example prediction models 120 are further discussed in FIG. 2.

In some implementations, the one or more prediction models 120 can be received from the server computing system 130 over network 180, stored in the user computing device memory 114, and then used or otherwise implemented by the one or more processors 112. In some implementations, the user computing device 102 can implement multiple parallel instances of a single prediction model 120.

Additionally, or alternatively, one or more prediction models 140 can be included in or otherwise stored and implemented by the server computing system 130 that communicates with the user computing device 102 according to a client-server relationship. For example, the prediction models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 (e.g., graphical keyboard 124, microphone 126, camera 128, optical sensors, touch sensors, buttons, switches, etc.) that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement the graphical keyboard 124. Other example user input components include a microphone 126, a graphical keyboard 124, a camera 128, or other means by which a user can provide user input.

The user computing device 102 can also include a graphical keyboard 124 (e.g., for use via a touchscreen) that receives user input. The graphical keyboard 124 can be provided (e.g., as part of an operating system (OS), third-party application, plugin) to one or more user devices (e.g., computers, smartphones, tablet computing devices, wearable computing devices). One or more aspects of the graphical keyboard 124 can be configured to provide suggested words and/or phrases by using the prediction model(s) 120 and/or prediction model(s) 140. The graphical keyboard 124 can be a multi-region graphical keyboard interface having a plurality of key regions. The plurality of key regions can include a first key region, a second key region, a third key region, and a fourth key region. The first key region can have a first set of keys, the second key region can have a second set of keys, and so on.

In accordance with aspects of the disclosure, a graphical keyboard 124 can include a graphical keyboard interface (e.g., for use via a touchscreen) can be provided (e.g., as part of an operating system (OS), third-party application, plugin) to or by the user computing device 102. For example, referring to FIG. 3B, a first key region 311, a second key region 312, a suggestion region 313, and a sequence region 316 can be associated with such a graphical keyboard interface. The dynamic keyboard interface can be provided in association with one or more of the application(s) executed by user computing device 102. For example, the graphical keyboard 124 can be associated with the application (e.g., email application 11, virtual keyboard application 12, text messaging application 13 in FIG. 1B, and/or the like), and, as illustrated in FIGS. 3A-3H, the graphical keyboard interface can be provided in association with such applications.

The server computing system 130 can include one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 can include or be otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more prediction models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example prediction models 140 are further discussed in FIG. 2.

The user computing device 102 and/or the server computing system 130 can train the models 120 and/or 140 via interaction with the training computing system 150 that can be communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the prediction models 120 and/or 140 stored at the user computing device 102 and/or the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the prediction models 120 and/or 140 based on a set of training data 162. The training data 162 can include, for example, previous user interactions with the suggestion region. The training data 162 can include a selection rate associated with a user selecting a word or phrase presented in the suggestion region of the graphical user interface.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 can include computer logic utilized to provide desired functionality. The model trainer 160 can be implemented in hardware, firmware, and/or software controlling a general-purpose processor. For example, in some implementations, the model trainer 160 can include program files stored on a storage device, loaded into a memory and executed by one or more processors. In other implementations, the model trainer 160 can include one or more sets of computer-executable instructions that are stored in a tangible computer-readable storage medium such as RAM, hard disk, or optical or magnetic media.

In some implementations, the prediction models 120 and/or 140 can be trained by the model trainer 160 using federated learning techniques to allow user-specific or device-specific model training, and global updates.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The prediction models 120 and/or 140 (e.g., machine-learned models) described in this specification may be used in a variety of tasks, applications, and/or use cases. In some implementations, the predictions models 120 and/or 140 can include transformer model. A transformer model can be a neural network that learns context and thus meaning by tracking relationship in sequential data (e.g., letters in a word, words in a sentence). Additionally, the predictions models 120 and/or 140 can include a recurrent neural network (RNN), such as a long short-term memory (LSTM) network. Additionally, the predictions models 120 and/or 140 can include an autoregressive model, and/or a feedforward network that can be distilled from any of the models.

In some implementations, when the prediction models 120 and/or 140 use a transformer model, the prediction models 120 and/or 140 can also utilize a masking technique by using an encoder and a decoder.

In some implementations, when the prediction models 120 and/or 140 can use a beam search algorithm. A beam search algorithm can be heuristic search algorithm that explores a graph by expanding the most promising node in a limited set. Beam search can be an optimization of best-first search (e.g., to define a set of suggested words and/or phrase) that enables the reduction of memory requirements.

In some implementations, the input to the prediction model(s) of the present disclosure can be text or natural language data. The prediction model(s) can process the text or natural language data to generate an output. As an example, the prediction model(s) can process the natural language data to generate a language encoding output. As another example, the prediction model(s) can process the text or natural language data to generate a latent text embedding output. As another example, the prediction model(s) can process the text or natural language data to generate a translation output. As another example, the prediction model(s) can process the text or natural language data to generate a classification output. As another example, the prediction model(s) can process the text or natural language data to generate a textual segmentation output. As another example, the prediction model(s) can process the text or natural language data to generate a semantic intent output. As another example, the prediction model(s) can process the text or natural language data to generate an upscaled text or natural language output (e.g., text or natural language data that is higher quality than the input text or natural language, etc.). As another example, the prediction model(s) can process the text or natural language data to generate a prediction output.

In some implementations, the input to the prediction model(s) of the present disclosure can be image data. The prediction model(s) can process the image data to generate an output. As an example, the prediction model(s) can process the image data to generate an image recognition output (e.g., a recognition of the image data, a latent embedding of the image data, an encoded representation of the image data, a hash of the image data, etc.). As another example, the prediction model(s) can process the image data to generate an image classification output. As another example, the prediction model(s) can process the image data to generate a prediction output.

In some implementations, the input to the prediction model(s) of the present disclosure can be speech data. The prediction model(s) can process the speech data to generate an output. As an example, the prediction model(s) can process the speech data to generate a speech recognition output. As another example, the prediction model(s) can process the speech data to generate an encoded speech output (e.g., an encoded and/or compressed representation of the speech data, etc.). As another example, the prediction model(s) can process the speech data to generate a textual representation output (e.g., a textual representation of the input speech data, etc.). As another example, the prediction model(s) can process the speech data to generate a prediction output. In some cases, the input includes audio data representing a spoken utterance and the task is a speech recognition task. The output may comprise a text output which is mapped to the spoken utterance.

In some implementations, the input to the prediction model(s) of the present disclosure can be encoding data (e.g., a sequence representation of keyboard button input(s), such as regions of an input interface associated with more granular input(s), etc.). The prediction model(s) can process the encoding data to generate an output. As an example, the prediction model(s) can process the encoding data to generate a word and/or phrase. As another example, the prediction model(s) can process the encoding data to generate a prediction output. For instance, in some embodiments, the encoding data can be input to a language model for predicting one or more natural-language outputs associated with the encoding data.

In some implementations, the input to the prediction model(s) of the present disclosure can be sensor data (e.g., hand and/or finger gestures captured from a camera of a computing device). The prediction model(s) can process the sensor data to generate an output. As an example, the prediction model(s) can process the sensor data to generate a word and/or phrase. As another example, the prediction model(s) can process the sensor data to generate a prediction output. As another example, the machine-learned model(s) can process the sensor data to generate a detection output. For example, the prediction model(s) can process the sensor data to confirm a selection of a word or phrase that is presented in the suggestion region of the graphical user interface. As another example, the prediction model(s) can process the sensor data to generate a visualization output.

For example, the graphical keyboard interface can receive facial gestures of a user as an input. The facial gestures can indicate a specific task to be performed by the computing system. In some instances, a user can control a mapping actions on the display of the computing system by moving the user's eyes (e.g., left and right, looking up and down, blinking, winking, or other facial gestures). In some instances, the graphical keyboard interface can be custom programmed by the developer or user to perform certain tasks based on a gesture (e.g., facial gesture, hand gesture, arm gesture, feet gesture). The optical sensors (e.g., camera) of the computing device can capture the gesture. For example, a user with dexterity impairment can program the graphical keyboard to perform a task (e.g., accept first suggested word, move selection of suggested word right, left, up or down) based on a gesture that can be performed by the user. In some instances, the developer can preprogram the graphical keyboard interface to perform a task based on a gesture by using a preassigned gesture mappings. The gesture mappings can be dependent on the type of dexterity impairment that a user may have. A user can select the type of dexterity impairment when initiating the graphical keyboard interface or by changing the settings of the graphical keyboard interface. The graphical keyboard interface can be programmed to perform specific actions based on different gestures based on the selection of the type of dexterity impairment.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
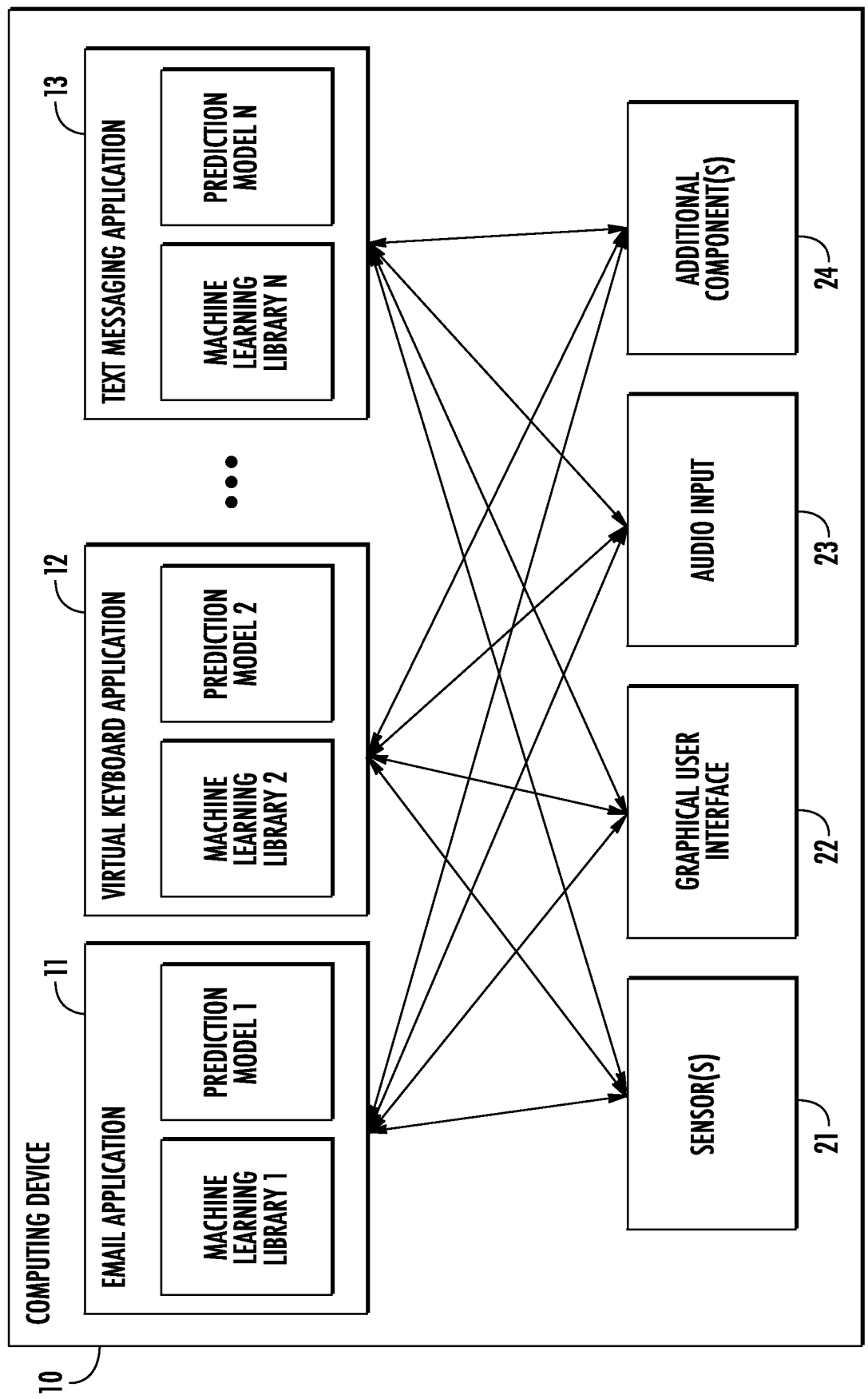

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and prediction model (e.g., prediction models 120, prediction model 140). For example, each prediction model can include a machine-learned model. Example applications include an email application 11, a virtual keyboard application 12, text messaging application 13, a dictation application, a browser application, etc.

As illustrated in FIG. 1B, each application can communicate with a number of other components of the computing device, such as, for example, one or more sensors 21 (e.g., button, camera), a graphical user interface 22 (e.g., virtual keyboard), an audio input 23 (e.g., microphone), a context manager, a device state component, and/or additional components 24. In some implementations, each application can communicate with each device component using an API (e.g., a public API). In some implementations, the API used by each application is specific to that application.

Figure 1C:
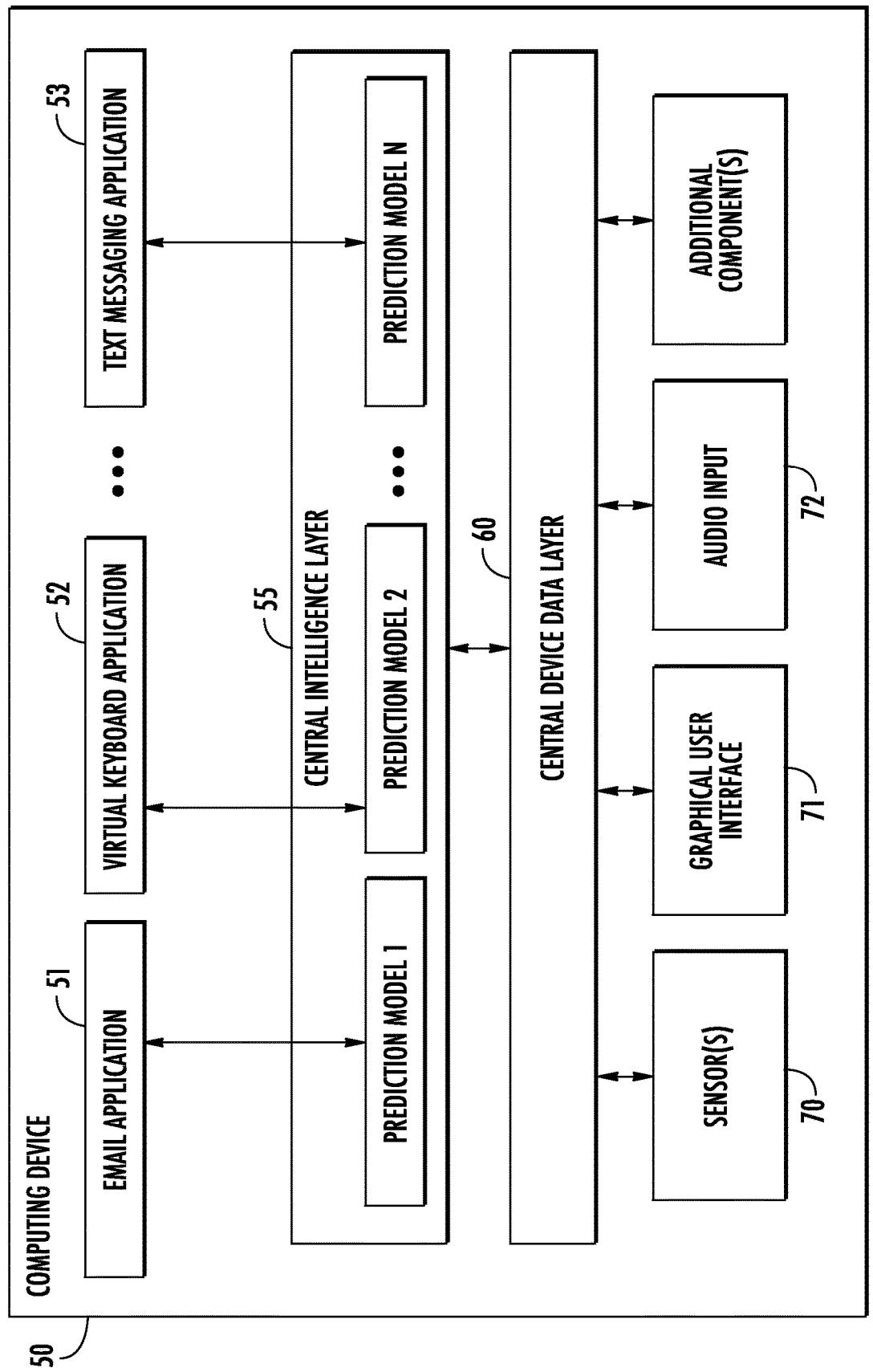

FIG. 1C depicts a block diagram of an example computing device 50 that performs according to example embodiments of the present disclosure. The computing device 50 can be a user computing device or a server computing device.

The computing device 50 includes a number of applications (e.g., email application, virtual keyboard application, text messaging application, web browsing application). Each application can be in communication with a central intelligence layer 55. Example applications include a text messaging application, an email application 51, a dictation application, a virtual keyboard application 52, a text messaging application 53, a browser application, etc. In some implementations, each application can communicate with the central intelligence layer 55 (and prediction model(s) stored therein) using an API (e.g., a common API across all applications).

The central intelligence layer 55 can include a number of prediction models (e.g., machine-learned models). For example, as illustrated in FIG. 1C, a respective prediction model can be provided for each application and managed by the central intelligence layer 55. In other implementations, two or more applications (e.g., email application 51 and text messaging application 53) can share a single prediction model. For example, in some implementations, the central intelligence layer 55 can provide a single prediction model for all of the applications. In some implementations, the central intelligence layer 55 can be included within or otherwise implemented by an operating system of the computing device 50.

The central intelligence layer 55 can communicate with a central device data layer 60. The central device data layer 60 can be a centralized repository of data for the computing device 50. As illustrated in FIG. 1C, the central device data layer can communicate with a number of other components of the computing device, such as, for example, one or more sensors 71, graphical user interface 72 (e.g., virtual keyboard), audio input 72, a context manager, a device state component, and/or additional components. In some implementations, the central device data layer 55 can communicate with each device component using an API (e.g., a private API).

Example Prediction Model Arrangements

Figure 2:
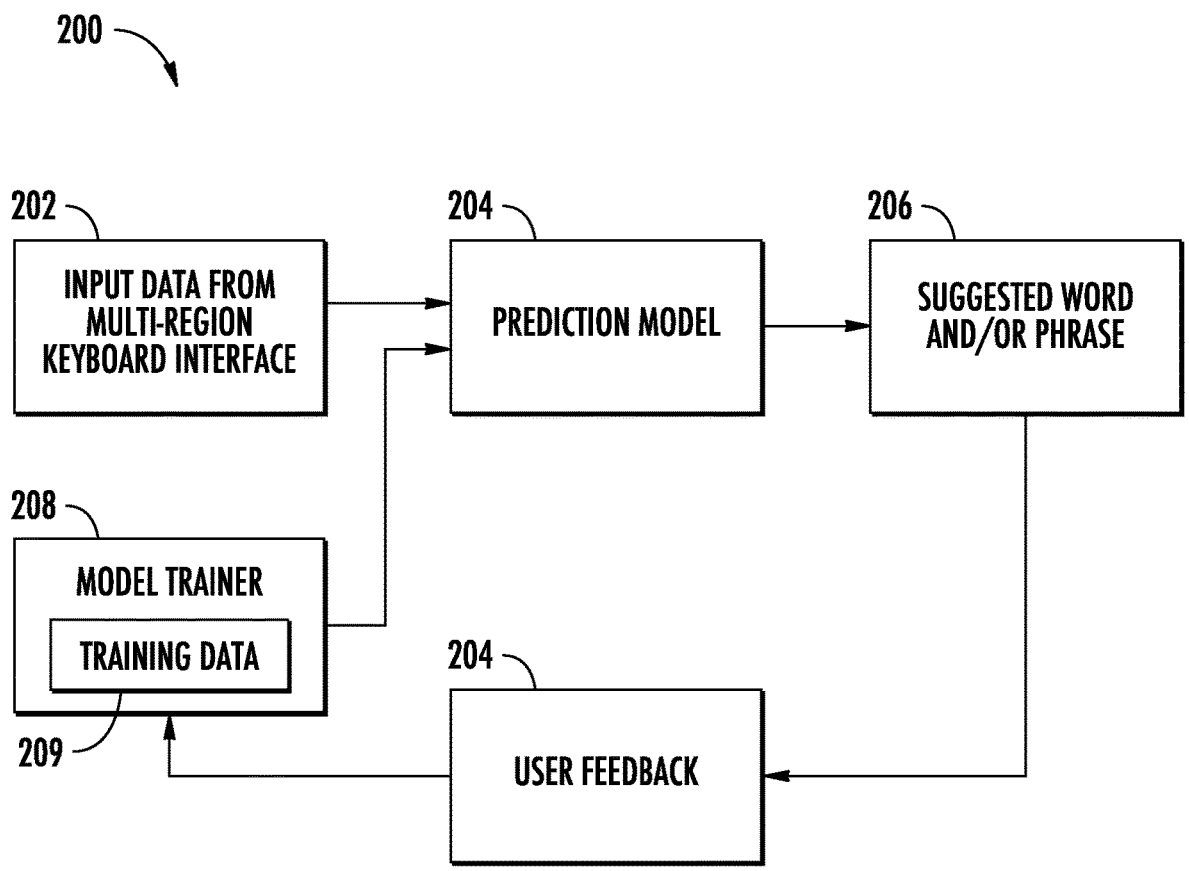
FIG. 2 depicts an example prediction system according to example embodiments of the present disclosure.

FIG. 2 depicts a block diagram of an example prediction system 200 according to example embodiments of the present disclosure. In some implementations, the prediction model 204 is trained to receive a set of input data 202 and determine (e.g., provide, output) a suggested word and/or phrase 206. The input data 202 can be descriptive of a user input obtained from a multi-region graphical keyboard interface. As a result of obtaining the input data 202, the prediction model 204 can determine a suggested word and/or phrase 206. The suggested word and/or phrase 206 can be presented on a suggestion region of a graphical user interface. Thus, in some implementations, the prediction system 200 can include a prediction model 202 that is operable to predict words and/or phrases. The prediction model can be a machined-learned model as described in FIGS. 1A-1C.

In some implementations, the computing system (user computing device 102, server computing device 130, training computing device 150, computing device 10, computing device 50) can process input data 202 to determine one or more suggested word and/or phrase 206 using the example prediction system 200 described in FIG. 2.

The computing system can access (e.g., obtain, receive) input data 202 from a multi-region graphical keyboard interface. For example, a user can input, using the graphical keyboard 124, a first input, a second input, a third input, and so on. The keys of the graphical keyboard 124 can be grouped in a plurality of key regions. Each input can correspond to the user selecting a region from the plurality of key regions. In some implementations, each input can correspond to the user selecting any of the keys in a region from the plurality of key regions. For example, a user can select a key or a region by touching the area of the graphical user interface that is presenting the key or region. In another example, a user can select a region by pushing a button (e.g., a button on a smartwatch, a button on a remote control) that corresponds to a region from the plurality of regions. In yet another example, when using a virtual reality system, a user can look at an area associated with a key or a region by looking and select the key or the region using a gesture (e.g., eye blinking, hand gesture, pushing a button on a handheld device). In yet another example, the region can be selected using a hand or arm gesture that is associated with a region in the plurality of key regions.

In some instances, the prediction model 204 can dynamically determine a suggested word and/or phrase based on previous user interactions (e.g., user history of typing, history of typing of a subset of users) and/or based on current context of the conversation with the user. Additionally, the prediction model 204 can predict a key to be selected next or an action to be performed by the graphical keyboard interface. The predicted key or the predicted action can be emphasized (e.g., highlighted) on the graphical user interface.

Additionally, the prediction model 204 can be trained by the model trainer 208 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. The model trainer 160 in FIG. 1A can be an example of the model trainer 208 in the prediction system 200.

In some implementations, the model trainer 208 can train the prediction model 204 based on a set of training data 209. The training data 209 can include the training data 162 described in FIG. 1A. Additionally, the training data 209 can include, for example, user feedback 210. The user feedback 210 can include previously user interactions with the suggested word and/or phrase 206. The user feedback 210 can include a selection rate associated with a user selecting a word or phrase presented in the suggestion region of the graphical user interface.

For example, in some embodiments, the prediction model 204 can include a machine-learned model configured to receive an input sequence and generate an output sequence. For instance, the prediction model 204 can include a transformer architecture (e.g., an encoder structure, a decoder structure, one or more self-attention heads, etc.). For instance, the prediction model 204 can include a model configured to operate over one or more input embeddings to generate natural language outputs.

For example, a pattern or sequence of selected region(s) can provide an input encoding. For instance, the input encoding can include a region sequence encoding indicative of a sequence of selection(s) of one or more regions. For instance, a sequence of received inputs can include: selection of a first region, selection of a second region, selection of the first region, and selection of the first region (e.g., First-Second-First-First). In this example, for instance, the region sequence encoding can include an embedding indicative of the pattern First-Second-First-First (e.g., "FSFF", "1211", numeric embeddings thereof, etc.). The region sequence embedding can be processed by the prediction model 204 to generate one or more suggested outputs (e.g., a probability distribution of suggested outputs) likely to correspond to the region sequence embedding. In this manner, for example, the higher-confidence region-level inputs can be used to predict granular-level outputs with improved robustness for processing low-precision inputs.

In some embodiments, the prediction model 204 can be trained based on a training dataset containing a natural language corpus. Training can be conducted in an unsupervised fashion by, for a given natural language sequence (e.g., a word), a corresponding sequence of regions (e.g., regions of a keyboard) can be automatically constructed based on location(s) of the symbolic inputs of the language sequence in the region(s). Using the corresponding sequence (or an embedding thereof) as an input, the prediction model 204 can be trained to predict the given natural language sequence. In this manner, for instance, the prediction model 204 can be trained in an unsupervised fashion. Such training can occur in addition to personalized training based on user interaction with the suggestion region (e.g., by selecting one or more suggested input(s) as the desired input).

Example Graphical User Interfaces

FIGS. 3A-3H depict example graphical user interfaces (GUIs) according to example embodiments of the present disclosure.

Figure 3A:
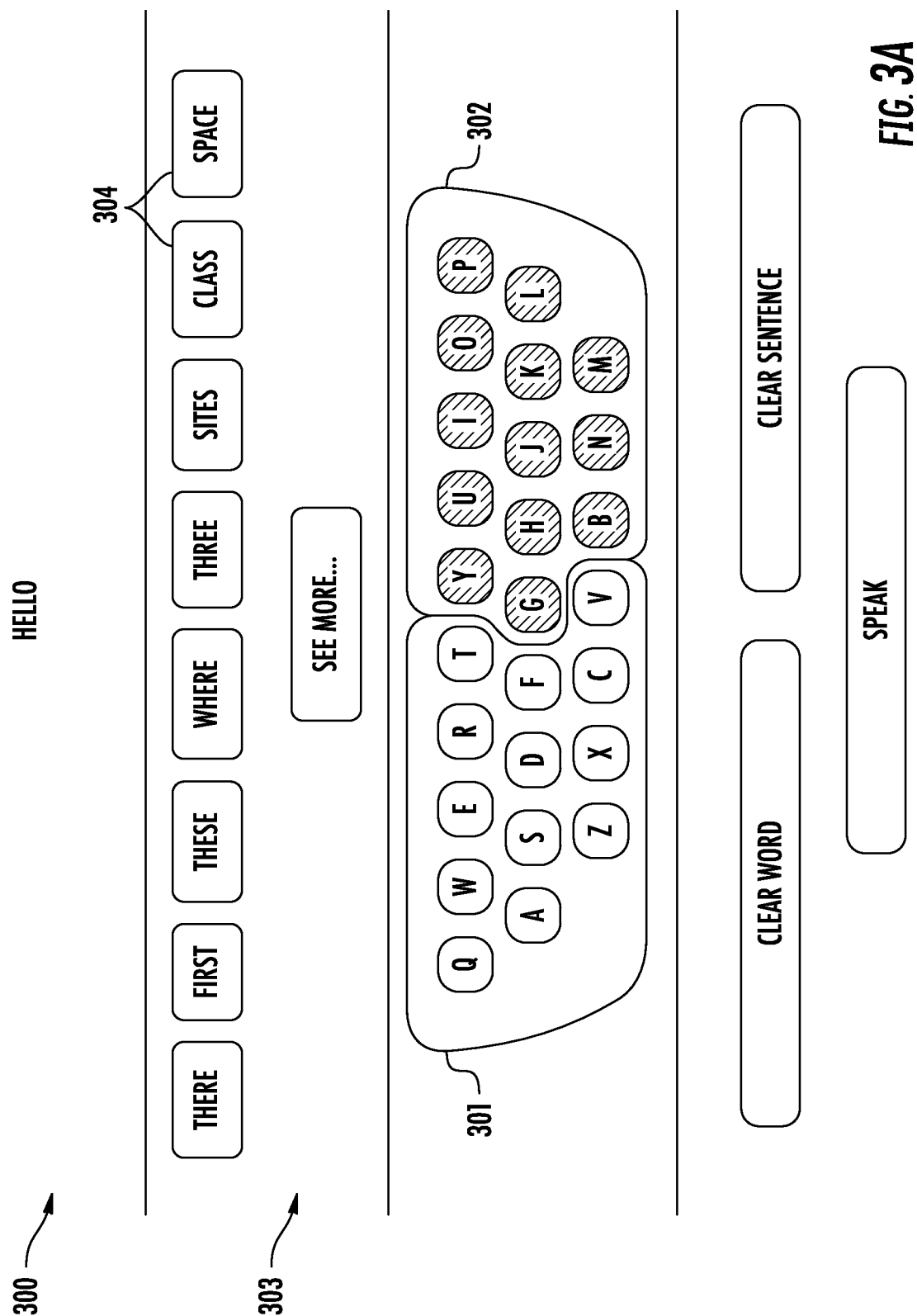

Referring to FIG. 3A, the GUI (e.g., graphical keyboard 300) can include a first set of keys in a first key region 301 and a second set of keys in a second key region 302. Additionally, the graphical keyboard 300 can include a suggestion region 303 having a plurality of words 304. In some implementations, the first set of keys can have a plurality (e.g., 20 keys, 15 keys, 10 keys, 8 keys) of keys, and the second set of keys can have a plurality of keys.

Figure 3B:
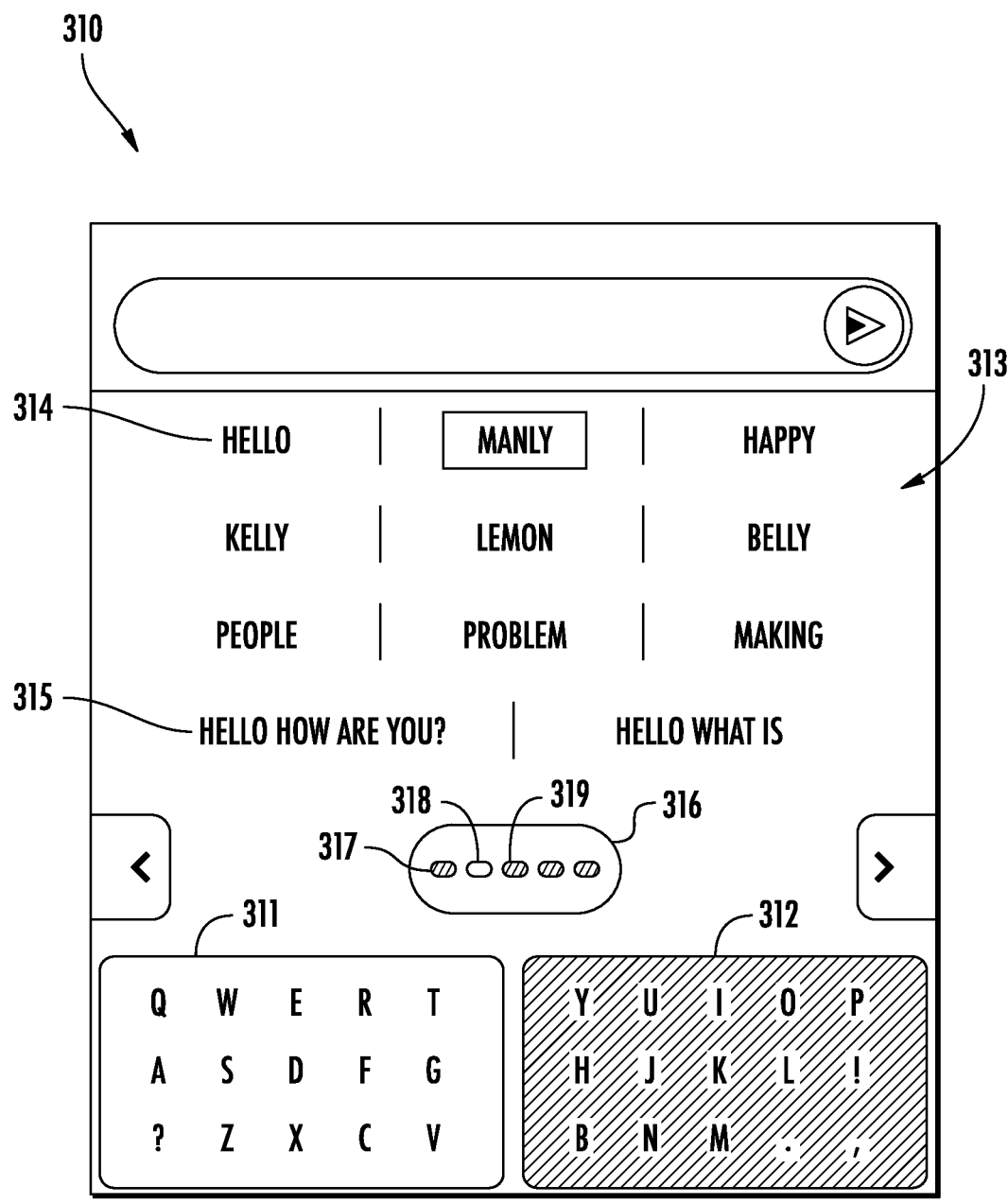

Referring to FIG. 3B, the graphical keyboard 310 can include a first set of keys in a first key region 311 and a second set of keys in a second key region 312. Additionally, the graphical keyboard 300 can include a suggestion region 313 having a plurality of words 314 and a plurality of phrases 315. Furthermore, the graphical keyboard 310 can include a sequence region 316 (also referred to herein as a breadcrumb user interface) having a sequence of symbols associated with each selected region from a previous user input. In some instances, each key region in the plurality of key regions can correspond to a unique symbol. In this example, the first key region 311 can be associated with a first symbol (e.g., clear dash symbol) and the second key region 312 can be associated with a second symbol (e.g., shaded dash symbol). As depicted in the sequence region 316, the first sequence element 317 is the second symbol, the second sequence element 318 is the first symbol, the third sequence element 319 is the second symbol. Thus, the sequence region indicates that the first user input included a key from the second key region 312 by displaying the second symbol, then that the subsequent second user input included a key from the first key region 311 by next displaying the first symbol, and so on. As a user continues to create these sequences, a breadcrumb can be presented in the sequence region 316 as a reminder of previous inputs.

In some implementations, the graphical keyboard 300 can have a third key region that can be associated with a third set of keys. The third key region can also be associated with a third symbol to be presented in the sequence region 316. In some implementations, the graphical keyboard 300 can have a fourth key region that can be associated with a fourth set of keys. The fourth key region can also be associated with a fourth symbol to be presented in the sequence region 316.

In some implementations, the set of keys in the first key region, second key region, and other key regions (e.g., third, fourth) may be minimized on the graphical user interface.

For example, once a user obtains touch-type memory (e.g., memorized which keys are in which key regions), the user may not need to view the different keys in the different key regions. With this implementation, the area of the graphical user interface can be used for other purposes, such as only presenting the suggestion region and/or sequence region. For example, in one embodiment, just the suggestion region, without the first and second key regions, may be presented on the graphical user interface of a computing device (e.g., smartwatch). In another embodiment, just the suggestion region and the sequence region may be presented on the graphical user interface of the computing device.

In some embodiments, the region(s) can be associated with inputs not on the graphical user interface. For instance, the region(s) can be associated with respective physical buttons or other inputs. For instance, the region(s) can be associated with buttons on the side of a smartwatch, on a television remote, gaming controller, etc., such that the graphical user interface can display the suggestion region.

FIG. 3B depicts a graphical keyboard 310 that can be presented on a smartphone, according to example embodiments. The graphical keyboard 310 can include an input area (e.g., for composing a message), and a transmit element that can correspond to an option to communicate the data located in such input area to an application (e.g., email application 10 in FIG. 1B). The location of the first key region 311, the second key region 312, suggestion region 313, and sequence region 316 on the GUI can be modified based on user request or design choice by the developers. In this example, as depicted in the sequence region, the user has input a sequence of Right button-Left button-Right button-Right button-Right button (i.e., RLRRR or shaded dash/white dash/shaded dash/shaded dash/shaded dash) which the system can predict the suggested word "Hello," "Kelly," "People," and so on. The user can select one of the suggested words 314 or suggested phrases 315 presented on the suggestion region 313.

Referring now to FIGS. 3C-3E, the graphical keyboard 320, 330, 340 depict an example of a typing process, according to example embodiments of the present disclosure. The graphical keyboard 320 in FIG. 3C is a two-button keyboard having a first set of keys in a first key region 321 and a second set of keys in a second key region 322. As depicted in this example, the first key region 321 can have more characters (e.g., letters) than the second key region 322, which can be a design choice by the developer of the graphical keyboard 320.

As a user continues typing on the graphical keyboard 330 in FIG. 3D, the sequence region 331 and the suggestion region 332 can be updated after every user input. As depicted in the sequence region 331, the last four user inputs are RRRL (i.e., shaded dash/shaded dash/shaded dash/white dash), and the prediction model (e.g., prediction model 204) can determine the suggested words and phrases that are presented in the suggestion region 332 of the graphical keyboard 330.

Referring to FIG. 3E, a user can select the desired word 'long' from the suggestion region 342 of the graphical keyboard 340. Based on the word selection, the words and/or phrases in the suggestion region 342 are updated by using the prediction model (e.g., prediction model 204).

The prediction model can determine a suggested word based on machine learning techniques described herein. In this example, the suggested words can be ranked and presented based on the ranking of each word. In some instances, words with the exact matches of the input sequence (e.g., for input RLRR, words in the predictive dictionary matching an input pattern of RLRR) can be ranked highest and can be presented at the top of the suggestion region. When two words have the same ranking, the more frequently used word can be ranked higher. Additionally, partial matches of the input sequence (e.g., for input RLRR, ranked matches for longer words beginning with RLRR) can be presented in the suggestion region after the words that are exact matches. Moreover, phrase matches for the input sequence (e.g., for input RLRR, ranked matches for phrases beginning with RLRR) can also be presented in the suggestion region. In some implementations, the highest ranked words and/or phrases can be presented at the top of the suggestion region.

In some implementations, word and phrase suggestions can be paginated when the top predictions (e.g., suggestions) do not match the user's intended input. For example, the region(s) of a keyboard or other input device can be used to create signals to the prediction model, and not just an explicit or direct source of text input. Additionally, a keyboard can maintain the familiarity of existing keyboard layouts, so that users do not have to learn a complex new text encoding scheme.

Figure 3F:
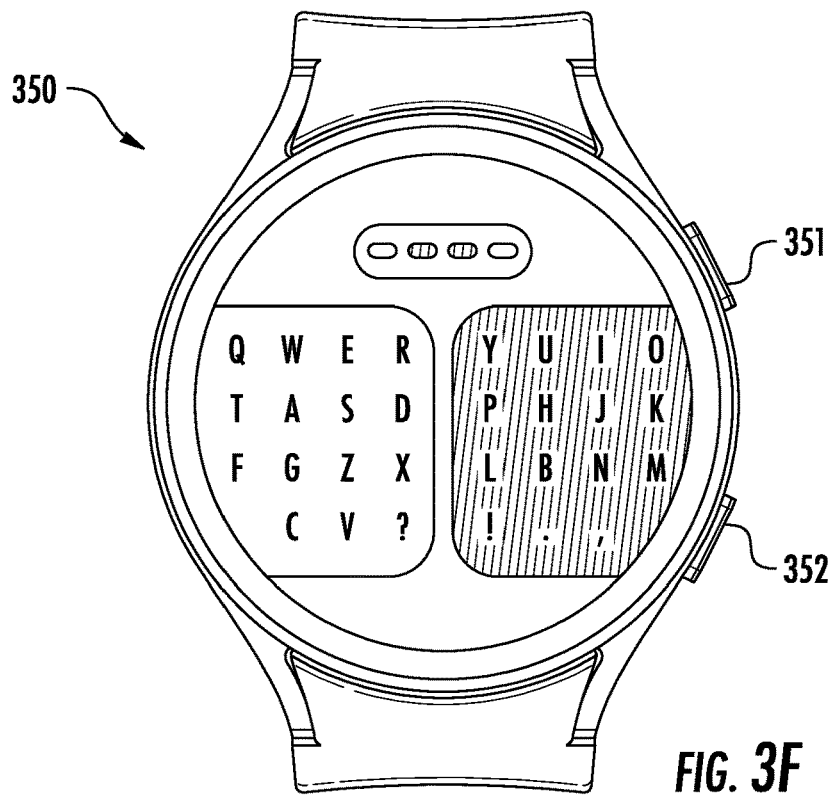

Referring to FIG. 3F, the graphical keyboard can be implemented on different types of computing systems, such as a smartwatch 350. Additionally, the computing system can include a first button 351, a second button 352, and so on. In some implementations, a user can select a key region from the plurality of key regions by pressing the first button 351 or, the second button 352. In some implementations, when the graphical keyboard includes a third key region (e.g., as depicted in FIG. 3I), a user can select the third region by pressing a third button (not pictured). In some implementations, when the graphical keyboard includes a fourth key region (e.g., as depicted in FIG. 3J), a user can select the fourth region by pressing a fourth button (not pictured). Additionally, or alternatively, a user can select a key region from the plurality of key regions by touching (e.g., pressing) the area of the watch face that is presenting the corresponding key region. For example, a user can touch the left side of the watch face to select the first key region, or the user can touch the right side of the touch screen (e.g., watch face) to select the second key region. Moreover, the graphical keyboard can include a suggestion region (not pictured) that presents suggested words and/or phrases. A user can select a suggested word or phrase by pressing on the area of the touch screen (e.g., watch face) that is presenting the suggested word or phrase. Furthermore, in some instances, a user can select a suggested word or phrase that is highlighted by pressing a button (e.g., the first button 351, the second button 352), by pressing a combination of buttons (e.g., the first button 351 and the second button 352), or by a hand gesture.

In some implementation, the graphical keyboard can be presented on a wearable computing device (e.g., smartwatch) that can be worn, for example, on an arm of a user. The wearable computing device can include a housing defining a cavity. Additionally, the wearable computing device can include button(s) that are partially positioned within a recess defined by an exterior surface of the housing. The button(s) can be positioned at a periphery (e.g., left-side, right-side, edge) of the housing. Moreover, the button(s) can include a plurality of sensors (e.g., strain sensor, ultrasonic sensor, motion sensor, optical sensor, and a force sensor) configured to detect actuation of the button via an input provided by a user and whether the user is touching the button. The wearable computing device can include one or more processors positioned within the cavity. The wearable computing device can include a printed circuit board disposed within the cavity. The computing device 100 can further include a battery (not shown) that is disposed within the cavity. Additionally, the computing device can include motion sensors positioned within the cavity of the housing. For example, the motion sensors may also include an accelerometer which may be used to capture motion data indicative of motion of the wearable computing device. Alternatively, or additionally, the motion sensors may also include a gyroscope which may also be used to capture motion information with respect to the wearable computing device. The hand or arm gesture can be determined based on the motion data obtained from a motion sensor. The wearable computing device can include a display screen to present the plurality of key regions of the graphical keyboard. As previously discussed, a user input can include pressing (e.g., touching) an area of the display screen that is associated with a key region from the plurality of key regions.

Figure 3G:
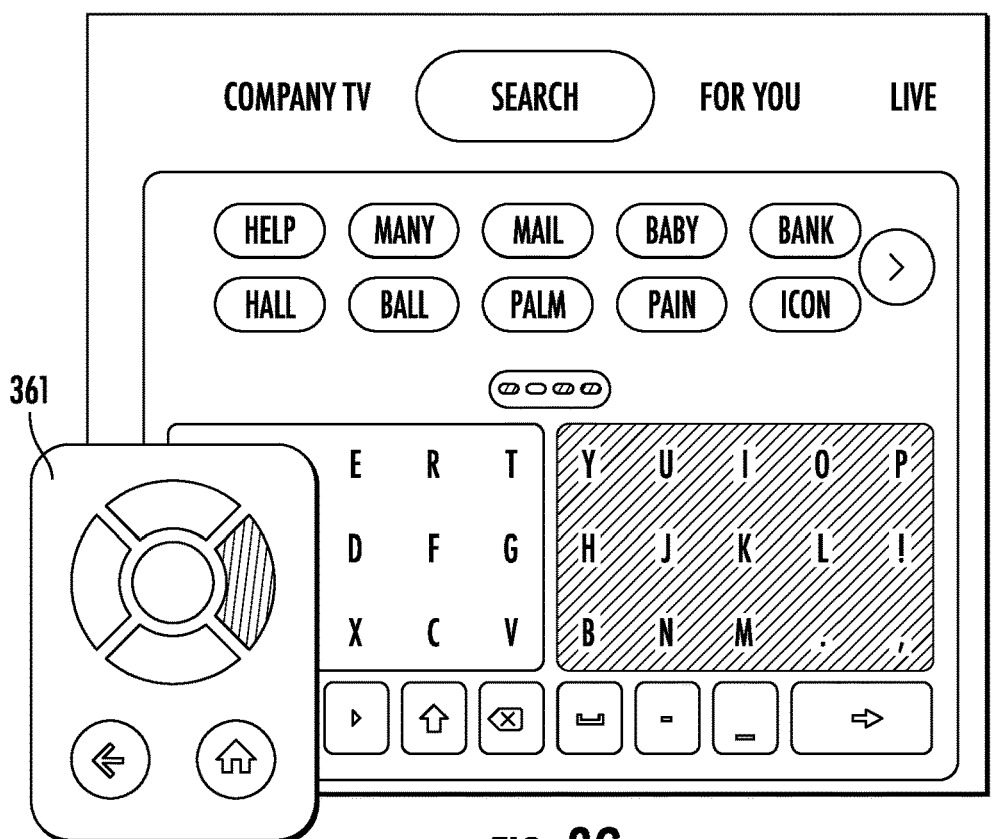

Referring to FIG. 3G, the graphical keyboard can be implemented on a smart television 360. In some implementations, the computing system can include a remote 361 having a plurality of buttons. For example, the plurality of key regions can correspond to different buttons on the remote 361. A user can select a key region from the plurality of key regions by user pressing a button on the remote 361.

Figure 3H:
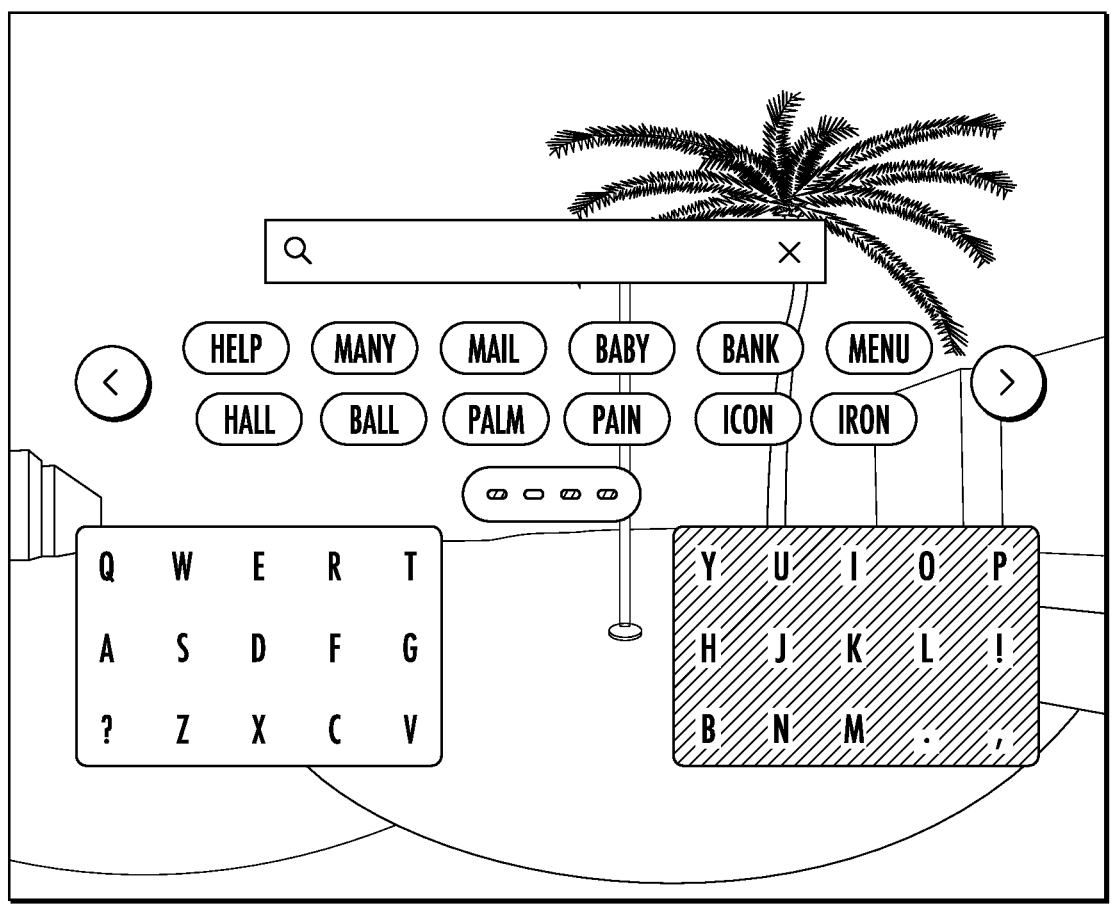
Figure 3I:
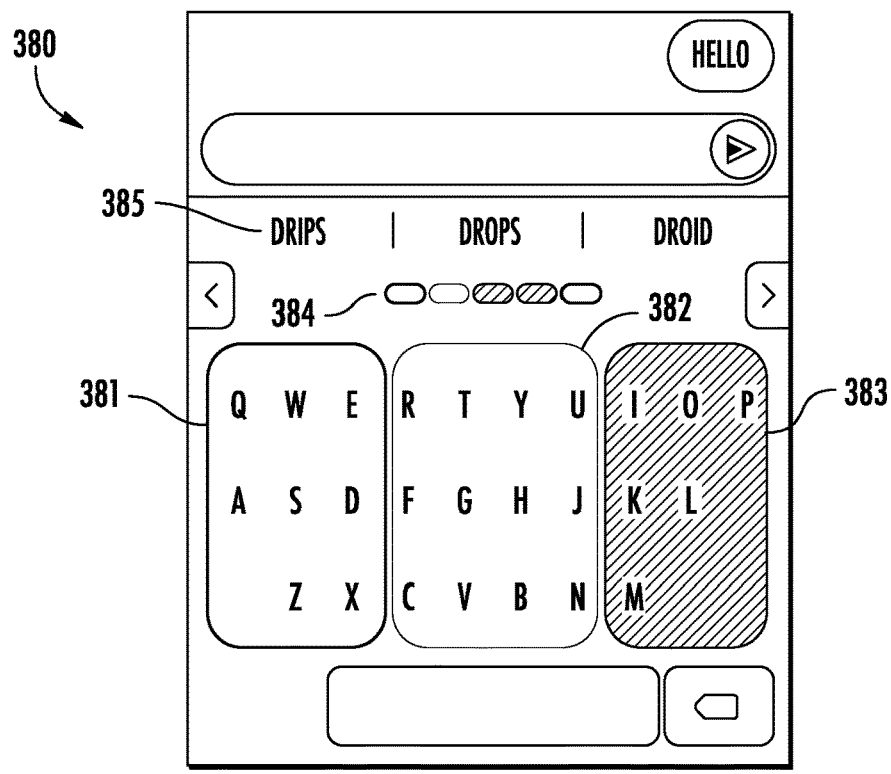
Figure 3J:
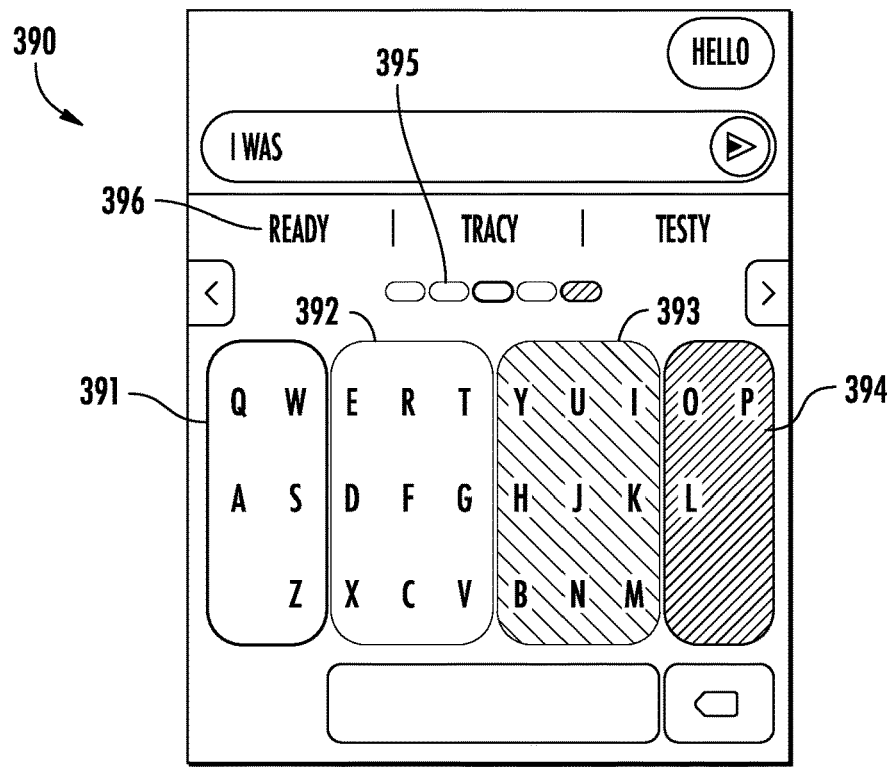

Referring to FIG. 3H, the graphical keyboard can be implemented on a tablet 370. In some implementations, the first key region 371 can be separated from the second key region 372 by a predetermined distance in order to make it easier for a user to operate the GUI. For example, by having the key regions closer to the edge of the tablet 370, it may be easier for a user to type while holding on to the tablet with both hands.

Referring to FIG. 3I, the graphical keyboard 380 can be implemented using a three-region keyboard. The graphical keyboard 380 can have a first key region 381, a second key region 382, and a third key region 383. Additionally, the graphical keyboard 380 can include a sequence region 384 presenting a first symbol associated with the selection of the first key region, a second symbol associated with selection of the second key region, and a third symbol associated with the selection of the third key region. Moreover, the graphical keyboard 380 can include a suggestion region 385 having suggested words and/or phrases based on the selections of the key regions.

Referring to FIG. 3J, the graphical keyboard 390 can be implemented using a four-region keyboard. The graphical keyboard 390 can have a fist key region 391, a second key region 392, a third key region 393, and a fourth key region 394. Additionally, the graphical keyboard 390 can include a sequence region 395 presenting a first symbol associated with the selection of the first key region, a second symbol associated with selection of the second key region, a third symbol associated with the selection of the third key region, and a fourth symbol associated with the selection of the fourth key region. Moreover, the graphical keyboard 390 can include a suggestion region 396 having suggested words and/or phrases based on the selections of the key regions.

Example Methods

Figure 4:
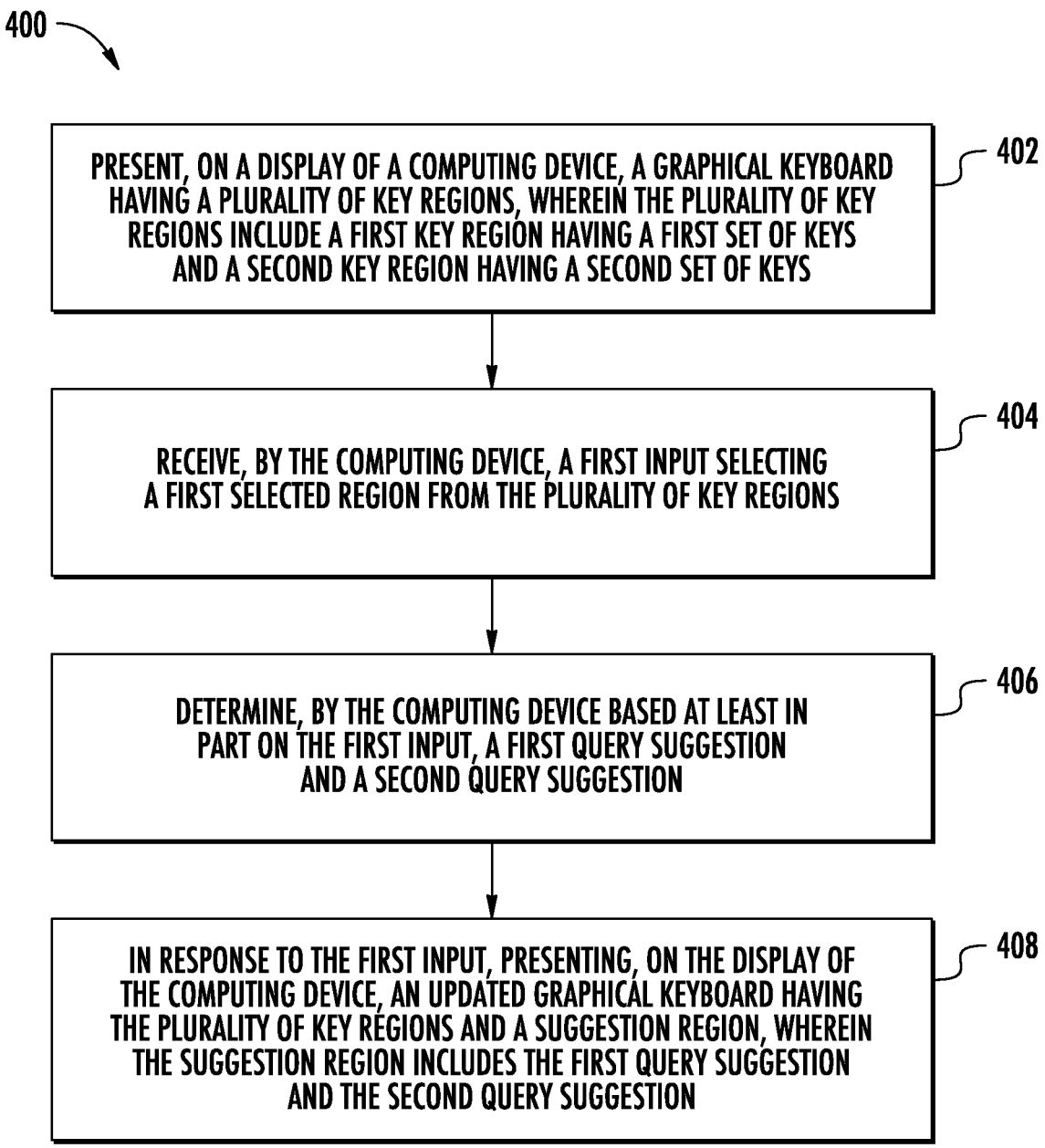
FIG. 4 depicts a flow chart diagram of an example method to perform prediction and assistive techniques using a multi-region graphical keyboard interface according to example embodiments of the present disclosure.

FIG. 4 depicts a flow chart diagram of an example method to perform prediction and assistive techniques using a multi-region graphical keyboard interface according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

At 402, a system (e.g., user computing system 102, server computing device 130, computing device 10, computing device 50) can present, on a display of a computing device, a graphical keyboard having a plurality of key regions. The plurality of key regions include a first key region having a first set of keys and a second key region having a second set of keys. For example, the first set of keys can be a plurality of keys in a standard keyboard. The second set of keys can be a plurality of keys in the standard keyboard that are different from the first set of keys.

In some implementations, the first set of keys can have a plurality (e.g., 20 keys, 15 keys, 10 keys, 8 keys) of keys, and the second set of keys can have a plurality of keys. Additionally, a key from the first set of keys with just one user input. For example, the key can be selected by a user pressing (e.g., touching the area associated with the first set of keys in the graphical user interface, pressing a physical button on a smartwatch or remote) the area associated with first set of keys only once. The predictive models 120 and/or 140 can determine the key from the first set of keys based on the sequence of inputs received from the user.

In some implementation, the graphical keyboard can include the QWERTY layout for English language, or the QWERTZ layout for German language.

In some implementations, the first set of keys can be keys located in a left column of the graphical keyboard, and the second set of keys can be keys located in the right column of the graphical keyboard.

In some implementations, the first key region has a greater number of keys than the second key region. For example, based on design studies, having a different number of keys in each key region may make the graphical keyboard interface more accessible and easier to operate.

In some implementations, the plurality of key regions can include a third key region having a third set of keys. The third set of keys are different from the first set of keys and the second set of keys.

In some implementations, the plurality of key regions include a fourth key region having a fourth set of keys. For example, the first set of keys can be keys located in a top-left quadrant of the graphical keyboard, the second set of keys can be keys located in a top-right quadrant of the graphical keyboard, the third set of keys can be keys located in a bottom-left quadrant of the graphical keyboard, and the fourth set of keys can be keys located in a bottom-right quadrant of the graphical keyboard.

At 404, the system can receive a first input selecting a first selected region from the plurality of key regions. For example, a user can select the first selected region by touching the area of the graphical keyboard either in the first key region or the second key region.

In some implementations, the computer device includes a first button and a second button, and the first input can be received by a user pressing the first button or the second button.

At 406, the system can determine, based at least in part on the first input, a first suggestion and a second suggestion. For example, the first and second suggestions can be determined using the prediction model 204 using the techniques described herein.

In some implementations, the first suggestion can be a word, and the second suggestion can be a phrase.

At 408, in response to the first input, the system can present, on the display of the computing device, an updated graphical keyboard having the plurality of key regions and a suggestion region. The suggestion region can include the first suggestion and the second suggestion. The first suggestion or the second suggestion can be selected with a user input. Once the suggestion is selected, the selected suggestion can be presented in a different region of the graphical keyboard interface.

In some implementations, the system can receive, by a sensor coupled to the computing device, a gesture. Additionally, in response to the gesture, the system can select the first suggestion.

Figure 5:
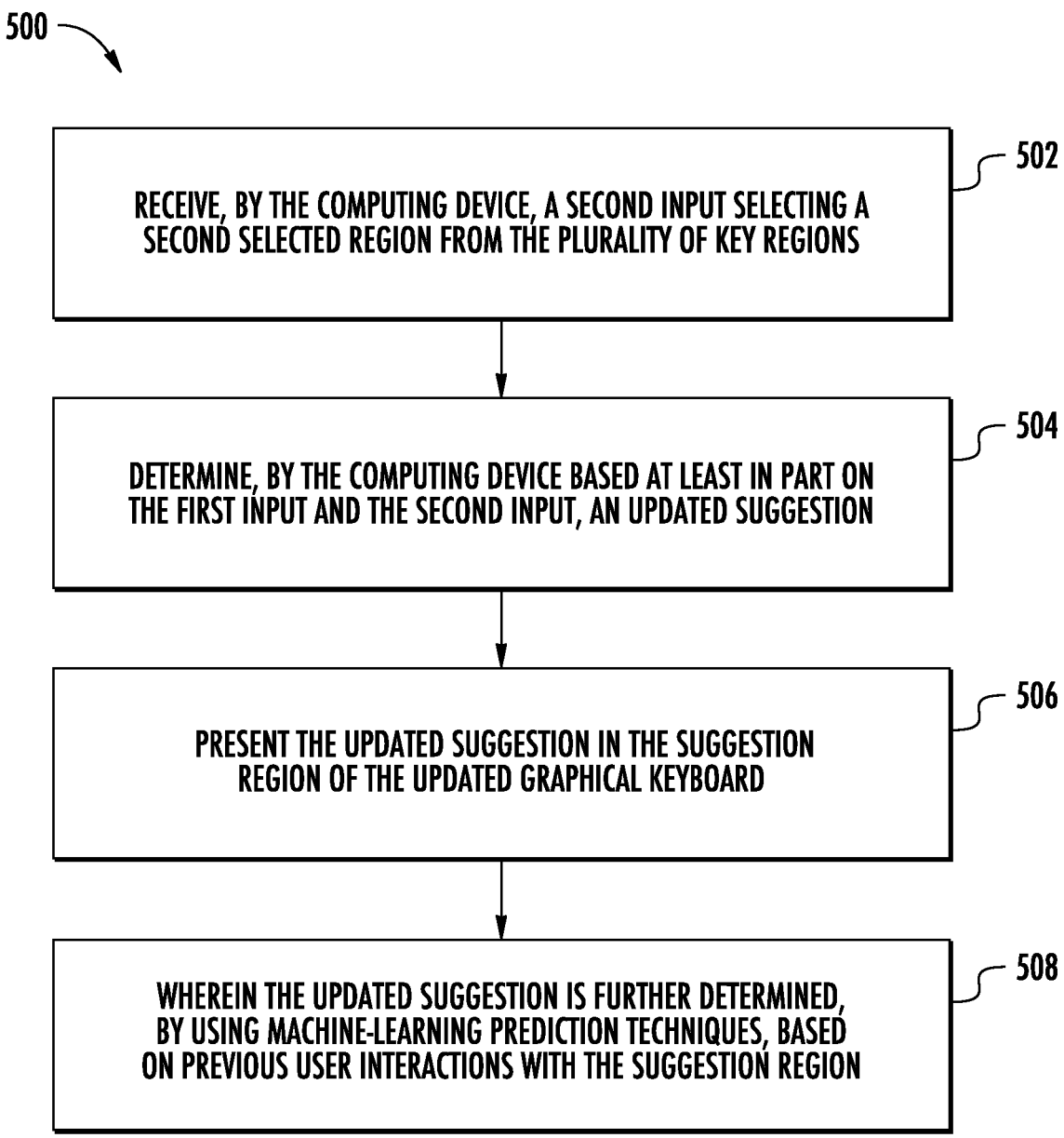
FIG. 5 depicts a flow chart diagram of an example method to update suggested words and/or phrases in the suggestion region of the graphical keyboard interface, according to example embodiments of the present disclosure.

FIG. 5 depicts a flow chart diagram of an example method to update suggested words and/or phrases in the suggestion region of the graphical keyboard interface, according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

At 502, continuing with method 400, the system (e.g., user computing system 102, server computing device 130, computing device 10, computing device 50) can receive a second input selecting a second selected region from the plurality of key regions. For example, after operation 404 in method 400, the system can receive the second input.

At 504, the system can rank, based at least in part on the first input and the second input, a plurality of words associated with the first input and the second input. For example, the prediction model (e.g., prediction model 204) can rank a plurality of words based on the first input and the second input.

In some implementations, the plurality of words are further ranked based on previous user interactions with the plurality of words. In some implementations, the plurality of words are also ranked on previous user interactions with the suggested region. For example, a word that is frequently selected by a user can be ranked higher than a word that is less frequently selected by the user.

At 506, the system can determine an updated suggestion from the plurality of words based on a ranking of a plurality of words. As previously described, the prediction model (e.g., prediction model 204) can determine the updated suggestion.

At 508, the system can present the updated suggestion in the suggestion region of the updated graphical keyboard.

In some implementations, the updated suggestion can be a suggested word with an exact match of the first input and the second input.

In some implementations, the updated suggestion is a suggested word with a partial match of the first input and the second input. For example, the suggested word can begin with characters (e.g., letters) associated with the first input and the second input.

In some implementations, the updated suggestion can be a suggested phrase with a partial match of the first input and the second input, and wherein the suggested phrase begins with characters (e.g., letters) associated with the first input and the second input.

Figure 6:
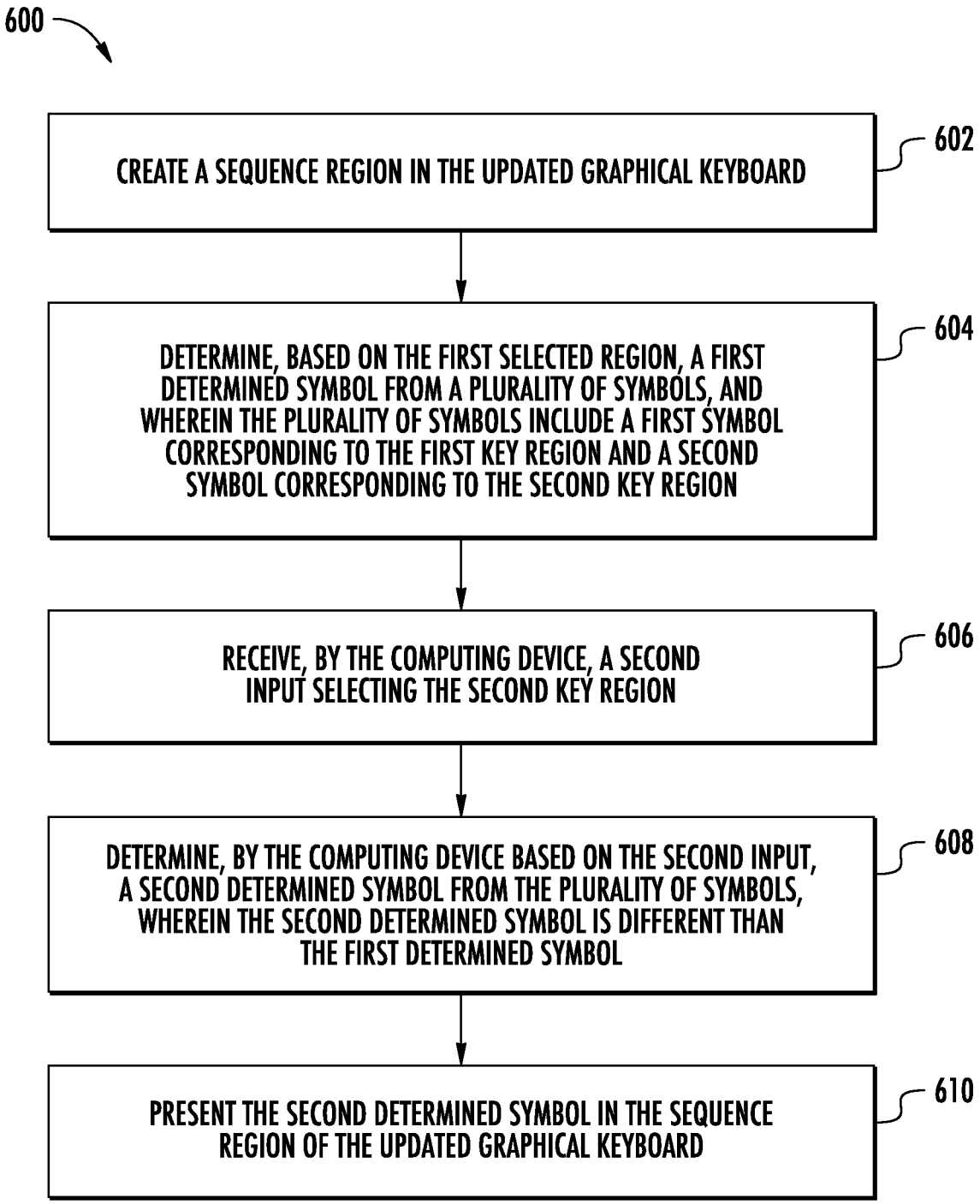
FIG. 6 depicts a flow chart diagram of an example method to present symbols in a sequence region of the graphical keyboard interface, according to example embodiments of the present disclosure.

FIG. 6 depicts a flow chart diagram of an example method to present symbols in a sequence region of the graphical keyboard interface, according to example embodiments of the present disclosure. Although FIG. 6 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

In some implementations, the graphical keyboard interface can include a sequence region.

At 602, the system (e.g., user computing system 102, server computing device 130, computing device 10, computing device 50) can create a sequence region in the updated graphical keyboard. Examples of the suggestion region are illustrated in FIGS. 3A-3I.

At 604, the system can determine, based on the first selected region, a first determined symbol from a plurality of symbols. The plurality of symbols can include a first symbol (e.g., shaded dash) corresponding to the first key region and a second symbol (e.g., white dash) corresponding to the second key region. In one example, the first selected region can be the first key region.

At 606, the system can receive a second input selecting a second key region.

At 608, the system can determine, based on the second input, a second determined symbol from the plurality of symbols. In this example, the second determined symbol can be different from the first determined symbol, because the second selected region can be the second key region.

At 610, the system can present the first determined symbol and the second determined symbol in the sequence region of the updated graphical keyboard.

In some implementations, the first determined symbol can be a first shape of a first color (e.g., shaded dash), and the second determined symbol is the first shape of a second color (e.g., white dash).

Figure 7:
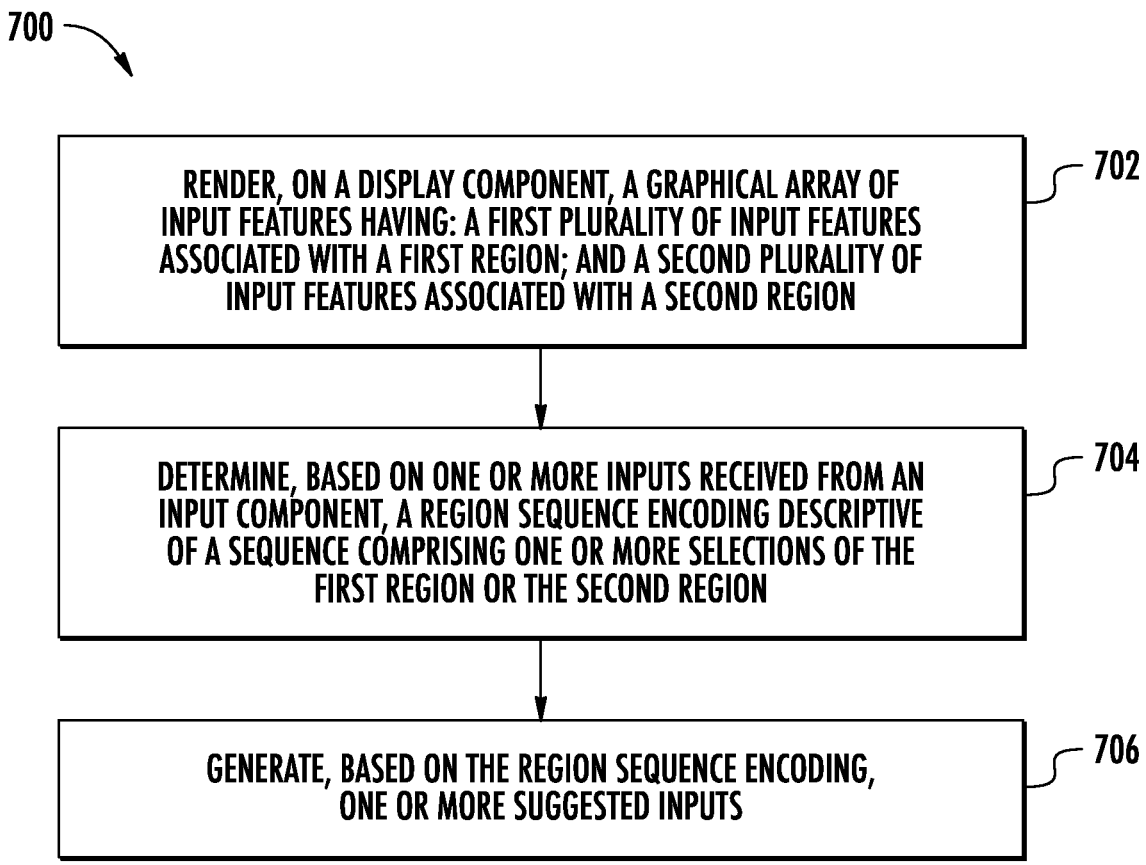
FIG. 7 depicts a flow chart diagram of another example method to perform prediction and assistive techniques using a graphical keyboard interface according to example embodiments of the present disclosure.

FIG. 7 depicts a flow chart diagram of another example method to perform prediction and assistive techniques using a graphical keyboard interface according to example embodiments of the present disclosure. Although FIG. 7 depicts steps performed in a particular order for purposes of illustration and discussion, the methods of the present disclosure are not limited to the particularly illustrated order or arrangement. The various steps of method 700 can be omitted, rearranged, combined, and/or adapted in various ways without deviating from the scope of the present disclosure.

At 702, a system ((e.g., user computing system 102, server computing device 130, computing device 10, computing device 50) can render, on a display component, a graphical array of input features having: a first plurality of input features associated with a first region; and a second plurality of input features associated with a second region.

In some implementations, the input features can correspond to language symbols.

In some implementations, the first region can correspond to a first area of a graphical keyboard and the second region can correspond to a second area of the graphical keyboard.

At 704, the system can determine, based on one or more inputs received from an input component, a region sequence encoding descriptive of a sequence comprising one or more selections of the first region or the second region. For example, the input data 202 in FIG. 2 can be an example of the one or more inputs received from an input component.

In some implementations, the one or more inputs can include inputs associated with input signals respectively assigned to the first region and the second region. The input signals can correspond to one or more physical toggles. Additionally, or alternatively, the input signals can respectively correspond to areas of a touch screen respectively overlying the first region and the second region. Additionally, or alternatively, the input signals can respectively correspond to a peripheral component.

At 706, the system can generate, based on the region sequence encoding, one or more suggested inputs. For example, the graphical user interface depicted in FIGS. 3A-3H illustrates the one or more suggested inputs that are generated at 706.

In some implementations, the one or more suggested inputs can include suggested words of a language (e.g., suggested words and/or suggested phrases generated by the prediction model(s) 204 in FIG. 2).

In some implementations, the one or more suggested inputs generated at 706 can be generated by inputting, to a prediction model (e.g., prediction model 204, machine-learned model), the region sequence encoding, generating, using the machine-learned model, the one or more suggested inputs.

In some implementations, the one or more suggested inputs generated at 706 can be generated by generating a probability distribution corresponding to the one or more suggested inputs.

In some implementations, the prediction model (e.g., prediction model 204, machine-learned model in method 700) can include a natural language model. Additionally, or alternatively, the prediction model (e.g., machine-learned model) can include one or more transformer architectures.

In some implementations, the prediction model (e.g., machine-learned model) can be trained on an unsupervised dataset based on, for a target keyboard layout, a sequence of regions associated with input of the symbols corresponding to a word in a vocabulary.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

What is claimed is:

1. A computer-implemented method comprising:
   presenting, on a display of a computing device, a graphical keyboard having a plurality of key regions, wherein the plurality of key regions include a first key region having a first set of keys and a second key region having a second set of keys, the first set of keys having a plurality of keys;
   receiving, by the computing device, a first input selecting a first selected region from the plurality of key regions, wherein the first selected region is the first key region;
   determining, based on the first selected region, a first determined symbol from a plurality of symbols, and wherein the plurality of symbols include a first symbol corresponding to the first key region and a second symbol corresponding to the second key region;
   determining, by the computing device based at least in part on the first input, a first suggestion and a second suggestion; and
   in response to the first input, presenting, on the display of the computing device, an updated graphical keyboard having the plurality of key regions, a sequence region, and a suggestion region, wherein the suggestion region includes the first suggestion and the second suggestion, and wherein the sequence region includes the first determined symbol.

2. The computer-implemented method of claim 1, further comprising:
   receiving, by the computing device, a second input selecting a second selected region from the plurality of key regions;
   determining, by the computing device based at least in part on the first input and the second input, an updated suggestion; and
   presenting the updated suggestion in the suggestion region of the updated graphical keyboard.

3. The computer-implemented method of claim 2, wherein the updated suggestion is determined based on a ranking of a plurality of words, and wherein the updated suggestion is a suggested word with an exact match of the first input and the second input.

4. The computer-implemented method of claim 3, wherein the plurality of words are further ranked based on previous user interactions with the plurality of words.

5. The computer-implemented method of claim 3, wherein the updated suggestion is a suggested word with a partial match of the first input and the second input, and wherein the suggested word begins with characters associated with the first input and the second input.

6. The computer-implemented method of claim 3, wherein the updated suggestion is a suggested phrase with a partial match of the first input and the second input, and wherein the suggested phrase begins with characters associated with the first input and the second input.

7. The computer-implemented method of claim 1, the method further comprising:
   presenting the determined symbol in the sequence region of the updated graphical keyboard.

8. The computer-implemented method of claim 1, wherein the first selected region is the first key region, the method further comprising:
   receiving, by the computing device, a second input selecting the second key region;
   determining, by the computing device based on the second input, a second determined symbol from the plurality of symbols, wherein the second determined symbol is different than the first determined symbol; and
   presenting the second determined symbol in the sequence region of the updated graphical keyboard.

9. The computer-implemented method of claim 8, wherein the first determined symbol is a first shape of a first color, and the second determined symbol is the first shape of a second color.

10. The computer-implemented method of claim 1, wherein the plurality of key regions include a third key region having a third set of keys, and wherein the third set of keys are different from the first set of keys and the second set of keys.

11. The computer-implemented method of claim 10, wherein the plurality of key regions include a fourth key region having a fourth set of keys.

12. The computer-implemented method of claim 11, wherein the first set of keys are keys located in a top-left quadrant of the graphical keyboard, wherein the second set of keys are keys located in a top-right quadrant of the graphical keyboard, wherein the third set of keys are keys located in a bottom-left quadrant of the graphical keyboard, and wherein the fourth set of keys are keys located in a bottom-right quadrant of the graphical keyboard.

13. The computer-implemented method of claim 1, wherein the first set of keys are keys located in a left column of the graphical keyboard, and wherein the second set of keys are keys located in a right column of the graphical keyboard.

14. The computer-implemented method of claim 1, wherein the computer device includes a first button and a second button, and the first input is received by a user pressing the first button or the second button.

15. The computer-implemented method of claim 1, further comprising:
   receiving, by a sensor coupled to the computing device, a gesture; and
   in response to the gesture, selecting the first suggestion.

16. The computer-implemented method of claim 1, wherein the first key region has a greater number of keys than the second key region.

17. The computer-implemented method of claim 1, wherein the first suggestion is a word, and wherein the second suggestion is a phrase.

18. A computer device comprising:
   one or more processors; and
   a memory storing instructions that when executed by the one or more processors cause the computer device to perform operations comprising:
      presenting, on a display of the computing device, a graphical keyboard having a plurality of key regions, wherein the plurality of key regions include a first key region having a first set of keys and a second key region having a second set of keys;
      receiving a first input selecting a first selected region from the plurality of key regions, wherein the first selected region is the first key region;
      determining, based on the first selected region, a first determined symbol from a plurality of symbols, and wherein the plurality of symbols include a first symbol corresponding to the first key region and a second symbol corresponding to the second key region;
      determining, based at least in part on the first input, a first suggestion and a second suggestion; and
      in response to the first input, presenting, on the display of the computing device, an updated graphical keyboard having the plurality of key regions, a sequence region, and a suggestion region, wherein the suggestion region includes the first suggestion and the second suggestion, and wherein the sequence region includes the first determined symbol.

19. The computer device of claim 18, wherein the updated graphical keyboard includes a sequence region, wherein the operations further include:
receiving a second input selecting a second selected region from the plurality of key regions;
determining, based at least in part on the first input and the second input, an updated suggestion;
determining, based on the first input, a first determined symbol associated with the first input from a plurality of symbols, and wherein the plurality of symbols include a first symbol corresponding to the first key region and a second symbol corresponding to the second key region;
determining, based on the second input, a second determined symbol associated with the second input from the plurality of symbols;
presenting the first determined symbol and the second determined symbol in the sequence region of the updated graphical keyboard; and
presenting the updated suggestion in the suggestion region of the updated graphical keyboard.

20. One or more non-transitory computer-readable media comprising instructions that when executed by one or more computing devices cause the one or more computing devices to perform operations comprising:
presenting, on a display of a computing device, a graphical keyboard having a plurality of key regions, wherein the plurality of key regions include a first key region having a first set of keys and a second key region having a second set of keys;
receiving a first input selecting a first selected region from the plurality of key regions, wherein the first selected region is the first key region;
determining, based on the first selected region, a first determined symbol from a plurality of symbols, and wherein the plurality of symbols include a first symbol corresponding to the first key region and a second symbol corresponding to the second key region;
determining, based at least in part on the first input, a first suggestion and a second suggestion; and
in response to the first input, presenting, on the display of the computing device, an updated graphical keyboard having the plurality of key regions, a sequence region, and a suggestion region, wherein the suggestion region includes the first suggestion and the second suggestion, and wherein the sequence region includes the first determined symbol.

* * * * *